United States Patent
Jiang et al.

(10) Patent No.: US 12,506,537 B2
(45) Date of Patent: Dec. 23, 2025

(54) METHOD AND DEVICE FOR MONITORING IMPAIRMENT, COHERENT RECEIVER AND NETWORK APPARATUS

(71) Applicant: Huawei Technologies Co., Ltd., Shenzhen (CN)

(72) Inventors: Zhiping Jiang, Kanata (CA); Choloong Hahn, Nepean (CA); Junho Chang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 18/492,905

(22) Filed: Oct. 24, 2023

(65) Prior Publication Data
US 2025/0132828 A1 Apr. 24, 2025

(51) Int. Cl.
*H04B 10/079* (2013.01)

(52) U.S. Cl.
CPC ... *H04B 10/0793* (2013.01); *H04B 10/07957* (2013.01)

(58) Field of Classification Search
CPC .................. H04B 10/0793; H04B 10/07957
USPC ........................................................ 398/33
See application file for complete search history.

(56) References Cited

U.S. PATENT DOCUMENTS

| | | | | |
|---|---|---|---|---|
| 8,781,317 B1 * | 7/2014 | Roberts | ........... | H04B 10/073 398/25 |
| 11,405,104 B1 * | 8/2022 | Hahn | ........... | H04B 10/0791 |
| 11,522,617 B1 * | 12/2022 | Jiang | ........... | H04B 10/6165 |
| 11,595,125 B2 * | 2/2023 | He | ........... | H04B 10/07953 |
| 11,968,033 B2 * | 4/2024 | Yamauchi | ........... | H04J 14/02216 |
| 2012/0201533 A1 * | 8/2012 | Gariepy | ........... | H04B 10/07953 398/26 |
| 2015/0304035 A1 * | 10/2015 | Nijhof | ........... | H04B 10/0793 398/26 |
| 2021/0058154 A1 * | 2/2021 | Musumeci | ........... | H04B 10/0793 |

(Continued)

OTHER PUBLICATIONS

Li et al; Nonlinearity Estimation and spectral regrowth prediction of power Amplifiers using correlation techniques-; 2005; University of California, San Diego, pp. 1-4. (Year: 2005).*

(Continued)

*Primary Examiner* — Amritbir K Sandhu
(74) *Attorney, Agent, or Firm* — Slater Matsil, LLP

(57) ABSTRACT

A method for monitoring impairment includes: receiving a first received waveform sent by the coherent receiver; obtaining a second received waveform including a first sub-waveform and a second sub-waveform with a relative first delay therebetween according to the first received waveform; obtaining a template at a predetermined location on the fiber link according to the second received waveform, wherein the template is used for representing a nonlinear noise by a first sub-signal waveform and a second sub-signal waveform at the predetermined location that are respectively obtained from the first sub-waveform and the second sub-waveform and have the first delay therebetween; obtaining a correlation between the second received waveform and the template; changing a value of the first delay to obtain values of the correlation corresponding to different values of the first delay; and outputting a value of the first delay corresponding to a maximum value of the correlation as impairment estimation.

20 Claims, 9 Drawing Sheets

(56) References Cited

U.S. PATENT DOCUMENTS

| | | | | |
|---|---|---|---|---|
| 2022/0343176 A1* | 10/2022 | Schmogrow | ........ | H04L 43/0876 |
| 2023/0118684 A1* | 4/2023 | Jiang | ................ | H04B 10/07953 398/25 |
| 2023/0198615 A1* | 6/2023 | Dou | ................... | H04B 10/0797 398/38 |
| 2025/0088283 A1* | 3/2025 | Jiang | .................. | H04B 10/2543 |

OTHER PUBLICATIONS

Yang et al; Iterative Minimum Mean Square Error Equalization for Optical Fiber Communication Systems; Oct. 2007, IEEE photonics technology letters, vol. 19, No. 19, pp. 1-3. (Year: 2007).*

Chang et al; Robust Longitudinal Power Profile Estimation using Enhanced Correlation Template Method ; 2024; IEEE; pp. 1-4. (Year: 2024).*

Rapp et al; Capturing Nonlinear Signal Distortions by the Spectral Correlation Method ; 2021; OSA; pp. 1-3. (Year: 2021).*

Hahn et al; Monitoring of Generalized Optical Signal-to-Noise Ratio using In-Band Spectral Correlation Method; 2022; European Conference on Optical Communications; pp. 1-4. (Year: 2022).*

Eto, M., et al., "Location-resolved PDL Monitoring with Rx-side Digital Signal Processing in Multi-span Optical Transmission System", Optical Fiber Communication Conference 2022, Mar. 6-10, 2022, 3 Pages, San Diego, California United States.

Hahn, C., et al., "Localization of Reflection Induced Multi-Path-Interference Over Multi-Span Transmission Link by Receiver-side Digital Signal Processing", Optical Fiber Communication Conference (OFC) 2022, Optica Publishing Group, Mar. 6-10, 2022, 3 Pages, San Diego, California United States.

Hauske, F., et al., "Optical Performance Monitoring in Digital Coherent Receivers", Journal of Lightwave Technology, vol. 27, No. 16, Aug. 15, 2009, 9 Pages.

Sasai, T., "Digital Longitudinal Monitoring of Optical Transmission Link", European Conference and Exhibition on Optical Communication 2022, Sep. 18-22, 2022, 4 Pages, Basel Switzerland.

Sasai, T., et al., "Performance Limit of Fiber-Longitudinal Power Profile Estimation Methods", Journal of Lightwave Technology, vol. 41, No. 11, Jun. 1, 2023, 13 Pages.

* cited by examiner

METHOD AND DEVICE FOR MONITORING IMPAIRMENT, COHERENT RECEIVER AND NETWORK APPARATUS

TECHNICAL FIELD

The present disclosure relates to the field of optical communications, and in particular, to a method for monitoring impairment, a device for monitoring impairment, a coherent receiver and a network apparatus.

BACKGROUND

Optical transmission networks based on optical fibers are used to transmit large amounts of information. As transmission links tends to be agile, disaggregated and open networking, it is necessary to monitor impairment of the transmitted signal across the optical networks.

SUMMARY

In a first aspect, a method for monitoring impairment is provided, which is applied to monitoring of an optical signal received by a coherent receiver through a fiber link. The method includes: receiving a first received waveform sent by the coherent receiver; obtaining a second received waveform according to the first received waveform, the second received waveform including a first sub-waveform and a second sub-waveform with a relative first delay therebetween; obtaining a template at a predetermined location on the fiber link according to the second received waveform, the template being used for representing a nonlinear noise by a first sub-signal waveform and a second sub-signal waveform at the predetermined location that are respectively obtained from the first sub-waveform and the second sub-waveform and have the first delay therebetween; obtaining a correlation between the second received waveform and the template; changing a value of the first delay to obtain values of the correlation corresponding to different values of the first delay; and outputting a value of the first delay corresponding to a maximum value of the correlation as impairment estimation.

In some embodiments, the method further includes: traversing each location on the fiber link to obtain values of the correlation corresponding to each location on the fiber link, and to output a value of the first delay corresponding to a maximum value of the correlation for each location.

In some embodiments, the first received waveform is a waveform with delay compensation, and the first received waveform includes a first initial sub-waveform and a second initial sub-waveform. Obtaining the second received waveform according to the first received waveform includes: adding the first delay to one of the first initial sub-waveform and the second initial sub-waveform to obtain the first sub-waveform and the second sub-waveform, respectively.

In some embodiments, obtaining the template at the predetermined location on the fiber link according to the second received waveform includes: obtaining a third sub-signal waveform through decision according the first sub-waveform of the second received waveform, and obtaining a fourth sub-signal waveform through decision according the second sub-waveform of the second received waveform; and obtaining the template at the predetermined location on the fiber link, the first sub-signal waveform and the second sub-signal waveform being obtained from the third sub-signal waveform and the fourth sub-signal waveform, respectively.

In some embodiments, the template is represented as: $\Delta u_{z_k}(\zeta,t,\tau)=-j\hat{D}_{z_k,\zeta}\hat{N}_{eRP}\hat{D}_{0,z_k}(u_1(0, t+\tau)+u_2(0, t))=\hat{D}_{z_k,\zeta}[-j(|u_1(z_k,t+\tau)|^2+|u_2(z_k,t)|^2-3)(u_1(z_k,t+\tau)+u_2(z_k,t))]$. $\Delta u_{z_k}(\zeta,t,\tau)$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform; $\hat{D}_{0,z_k}$ represents CD from location 0 to the predetermined location $z_k$ on the fiber link; $u_1(0, t+\tau)$ represents that $u_1(0,t)$ has the first delay $\tau$ with respect to $u_2(0, t)$, $u_1(0, t)$ and $u_2(0, t)$ are normalized signal waveforms at location 0 and time t obtained from the first sub-waveform and the second sub-waveform of the second received waveform, respectively; $u_1(z_k,t+\tau)$ and $u_2(z_k,t)$ represent the first sub-signal waveform and the second sub-signal waveform at the predetermined location $z_k$, respectively; j is an imaginary unit of a complex number; $\hat{N}_{eRP}$ represents a nonlinear operator based on an enhanced regular perturbation (eRP) model, $\hat{N}_{eRP} \equiv (|\cdot|^2 - 1.5 \times \langle |\cdot|^2 \rangle)(\cdot)$.

In some embodiments, the correlation is represented as: $CR(E_{tot}(\zeta,t,\tau), \Delta u_{z_k}(\zeta,t,\tau)) = \int_0^L \gamma P(z) g(z_k-z) dz \equiv \gamma P(z_k) L_{CR}(z_k)$. $CR(A(t), B(t)) \equiv \langle A(t)B^*(t) \rangle$, which represents correlation calculation between A(t) and B(t); $\langle \cdot \rangle$ represents time average operation; $E_{tot}(\zeta,t,\tau)$ represents the second received waveform; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z) dz;$$

$g(z_k-z) \equiv CR(\Delta u_{z_k}(\zeta,t,\tau), \Delta u_z(\zeta,t,\tau))$ represents a spatial response function; $P(z_k)$ represents a signal power at the predetermined location $z_k$; $P(z)$ represents a signal power at location z, and the location z is any location on the fiber link.

In some embodiments, the first sub-waveform and the second sub-waveform are an x-polarization sub-waveform and a y-polarization sub-waveform, respectively; the x-polarization sub-waveform is represented as $E_{tot,x}(\zeta,t+\tau)$, the y-polarization sub-waveform is represented as $E_{tot,y}(\zeta,t)$, and $E_{tot}(\zeta,t,\tau) = E_{tot,x}(\zeta,t+\tau) + E_{tot,y}(\zeta,t)$. Alternatively, the first sub-waveform and the second sub-waveform are the y-polarization sub-waveform and the x-polarization sub-waveform, respectively; the x-polarization sub-waveform is represented as $E_{tot,x}(\zeta,t)$, the y-polarization sub-waveform is represented as $E_{tot,y}(\zeta,t+\tau)$, and $E_{tot}(\zeta,t,\tau)=E_{tot,x}(\zeta,t)+E_{tot,y}(\zeta,t+\tau)$.

In some other embodiments, the first sub-waveform and the second sub-waveform are sub-waveforms of a second spatial mode and a first spatial mode, respectively; the sub-waveform of the first spatial mode is represented as $E_{tot,1}(\zeta,t)$, the sub-waveform of the second spatial mode is represented as $E_{tot,2}(\zeta,t+\tau)$, and $E_{tot}(\zeta,t,\tau)=E_{tot,1}(\zeta,t)+E_{tot,2}(\zeta,t+\tau)$.

In some embodiments, the second received waveform further includes at least one sub-waveform in addition to the first sub-waveform and the second sub-waveform, spatial modes of all sub-waveforms of the second received waveform are different, and there is a relative delay between the first sub-waveform and any sub-waveform except for the first sub-waveform of the second received waveform; and the nonlinear noise at the predetermined location is also represented by at least one sub-signal waveform at the predetermined location that is obtained from the at least one sub-waveform of the second received waveform.

In some embodiments, the second received waveform is represented as: $E_{tot}(\zeta,t,\tau_1,\ldots,\tau_{i-1})=E_{tot,1}(\zeta,t)+E_{tot,2}(\zeta,t+\tau_1)+\ldots+E_{tot,i}(\zeta,t+\tau_{i-1})$, where $E_{tot,1}(\zeta,t)$ represents the first sub-waveform with a first spatial mode, $E_{tot,2}(\zeta,t+\tau_1)$ represents the second sub-waveform with a second spatial mode, and $E_{tot,i}(\zeta,t+\tau_{i-1})$ represents any sub-waveform except for the first sub-waveform and the second sub-waveform, and i is a positive integer and takes a value from 3. The template is represented as: $\Delta u_{z_k}(\zeta,t,\tau_1,\ldots,\tau_{i-1})=-j\hat{D}_{z_k,\zeta}\hat{N}_{eRP}\hat{D}_{0,z_k}(u_1(0,t)+u_2(0,t+\tau_1)+\ldots+u_i(0,t+\tau_{i-1}))$, where $\Delta u_{z_k}(\zeta,t,\tau_1,\ldots,\tau_{i-1})$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform; $\hat{D}_{0,z_k}$ represents CD from location 0 to the predetermined location $z_k$ on the fiber link; $u_2(0,t+\tau_1)$ represents that $u_2(0,t)$ has the first delay $\tau_1$ with respect to $u_1(0,t)$, $u_1(0,t)$ and $u_2(0,t)$ are normalized signal waveforms of the first spatial mode and the second spatial mode at location 0 and time t, respectively; $u_i(0,t+\tau_{i-1})$ represents that $u_i(0,t)$ has a delay $\tau_{i-1}$ with respect to $u_1(0,t)$, $u_i(0,t)$ is a normalized signal waveform of any spatial mode except for the first spatial mode and the second spatial mode in the spatial modes of all sub-waveforms of the second received waveform at location 0 and time t; j is an imaginary unit of a complex number; $\hat{N}_{eRP}$ represents a nonlinear operator based on an enhanced regular perturbation (eRP) model, $\hat{N}_{eRP} \equiv (|\cdot|^2 - m \times \langle |\cdot|^2 \rangle)(\cdot)$, and m is related to the number of the spatial modes. The correlation is represented as: $CR(E_{tot}(\zeta,t,\tau_1,\ldots,\tau_{i-1}), \Delta u_{z_k}(\zeta,t,\tau_1,\ldots,\tau_{i-1}))=\int_0^L \gamma P(z) g(z_k-z) dz \equiv \gamma P(z_k) L_{CR}(z_k)$, where $CR(A(t),B(t)) \equiv \langle A(t)B^*(t) \rangle$, which represents correlation calculation between A(t) and B(t); $\langle \cdot \rangle$ represents time average operation; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z) dz;$$

$g(z_k-z) \equiv CR(\Delta u_{z_k}(\zeta,t,\tau_1,\ldots,\tau_{i-1}), \Delta u_z(\zeta,t,\tau_1,\ldots,\tau_{i-1}))$ represents a spatial response function; $P(z_k)$ represents a signal power at the predetermined location $z_k$; $P(z)$ represents a signal power at location z, and the location z is any location on the fiber link.

In a second aspect, a device for monitoring impairment is provided, which is applied to monitoring of an optical signal received by a coherent receiver through a fiber link. The device includes an interface circuit and a processing circuit coupled to the interface circuit. The interface circuit is used to receive a first received waveform. The processing circuit is used to: obtain a second received waveform according to the first received waveform, the second received waveform including a first sub-waveform and a second sub-waveform with a relative first delay therebetween; obtain a template at a predetermined location on the fiber link according to the second received waveform, the template being used for representing a nonlinear noise by a first sub-signal waveform and a second sub-signal waveform at the predetermined location that are respectively obtained from the first sub-waveform and the second sub-waveform and have the first delay therebetween; obtain a correlation between the second received waveform and the template; change a value of the first delay to obtain values of the correlation corresponding to different values of the first delay; and output a value of the first delay corresponding to a maximum value of the correlation as impairment estimation.

In some embodiments, the processing circuit is further used to traverse each location on the fiber link to obtain values of the correlation corresponding to each location on the fiber link, and to output a value of the first delay corresponding to a maximum value of the correlation for each location.

In some embodiments, the first received waveform is a waveform with delay compensation, and the first received waveform includes a first initial sub-waveform and a second initial sub-waveform; and the processing circuit is used to add the first delay to one of the first initial sub-waveform and the second initial sub-waveform to obtain the first sub-waveform and the second sub-waveform, respectively.

In some embodiments, the processing circuit is used to: obtain a third sub-signal waveform through decision according the first sub-waveform of the second received waveform, and obtain a fourth sub-signal waveform through decision according the second sub-waveform of the second received waveform; and obtain the template at the predetermined location on the fiber link, the first sub-signal waveform and the second sub-signal waveform being obtained from the third sub-signal waveform and the fourth sub-signal waveform, respectively.

In some embodiments, the template is represented as: $\Delta u_{z_k}(\zeta,t,\tau)=-j\hat{D}_{z_k,\zeta}\hat{N}_{eRP}\hat{D}_{0,z_k}(u_1(0,t+\tau)+u_2(0,t))=\hat{D}_{z_k,\zeta}[-j(|u_1(z_k,t+\tau)|^2+|u_2(z_k,t)|^2-3)(u_1(z_k,t+\tau)+u_2(z_k,t))]$. $\Delta u_{z_k}(\zeta,t,\tau)$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform; $\hat{D}_{0,z_k}$ represents CD from location 0 to the predetermined location $z_k$ on the fiber link; $u_1(0,t+\tau)$ represents that $u_1(0,t)$ has the first delay $\tau$ with respect to $u_2(0,t)$, $u_1(0,t)$ and $u_2(0,t)$ are normalized signal waveforms at location 0 and time t obtained from the first sub-waveform and the second sub-waveform of the second received waveform, respectively; $u_1(z_k,t+\tau)$ and $u_2(z_k,t)$ represent the first sub-signal waveform and the second sub-signal waveform at the predetermined location $z_k$, respectively; j is an imaginary unit of a complex number; $\hat{N}_{eRP}$ represents a nonlinear operator based on an enhanced regular perturbation (eRP) model, $\hat{N}_{eRP} \equiv (|\cdot|^2 - 1.5 \times \langle |\cdot|^2 \rangle)(\cdot)$.

In some embodiments, the correlation is represented as: $CR(E_{tot}(\zeta,t,\tau), \Delta u_{z_k}(\zeta,t,\tau))=\int_0^L \gamma P(z) g(z_k-z) dz \equiv \gamma P(z_k) L_{CR}(z_k)$. $CR(A(t),B(t)) \equiv \langle A(t)B^*(t) \rangle$, which represents correlation calculation between A(t) and B(t); $\langle \cdot \rangle$ represents time average operation; $E_{tot}(\zeta,t,\tau)$ represents the second received waveform; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z) dz;$$

$g(z_k-z) \equiv CR(\Delta u_{z_k}(\zeta,t,\tau), \Delta u_z(\zeta,t,\tau))$ represents a spatial response function; $P(z_k)$ represents a signal power at the predetermined location $z_k$; $P(z)$ represents a signal power at location z, and the location z is any location on the fiber link.

In a third aspect, a coherent receiver is provided. The coherent receiver includes a receiving circuit and the device for monitoring impairment. The receiving circuit is used for coupling a fiber link and receiving an optical signal transmitted by the fiber link. The first received waveform received by the device is obtained based on the optical signal.

In some embodiments, the coherent receiver further includes a digital signal processor (DSP) coupled to the receiving circuit and the device. the DSP is used to perform chromatic dispersion (CD) and time delay compensation on the optical signal to obtain the first received waveform, and then send the first received waveform to the device.

In a fourth aspect, a network apparatus is provided. The network apparatus includes a coherent receiver and the device for monitoring impairment. The coherent receiver is coupled to a fiber link, and is used to obtain a first received waveform based on an optical signal transmitted by the fiber link. The device is coupled to the coherent receiver and receives the first received waveform.

In some embodiments, the coherent receiver includes a receiving circuit and a digital signal processor (DSP). The receiving circuit is coupled to the fiber link for receiving the optical signal transmitted by the fiber link. The DSP is used to perform chromatic dispersion (CD) and time delay compensation on the optical signal to obtain the first received waveform, and then send the first received waveform to the device.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings.

DETAILED DESCRIPTION

Figure 1:
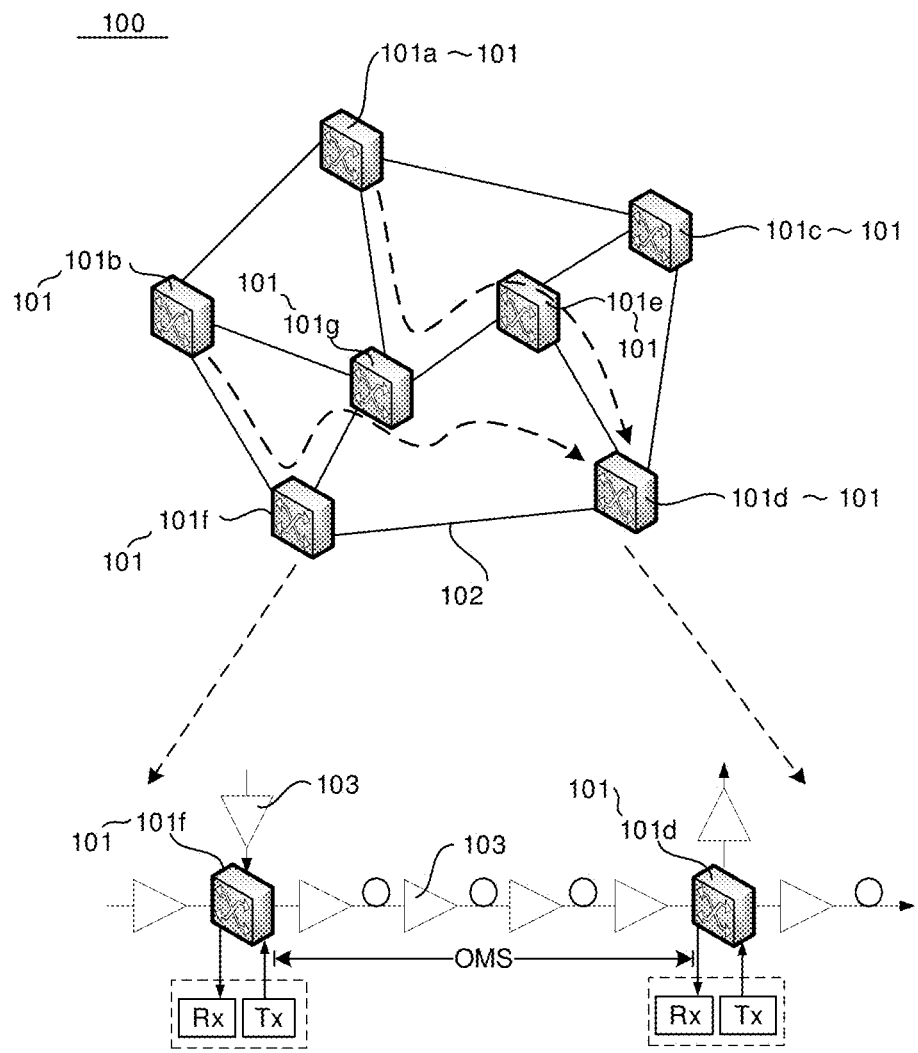
FIG. 1 is an optical communication network, in accordance with some embodiments of the present disclosure.

Technical solutions in embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials or characteristics may be included in any one or more embodiments or examples in any suitable manner.

The terms used herein are only intended to describe particular representative embodiments and are not intended to be limiting of the present disclosure. As used herein, the singular forms "a," "an" and "the" are intended to include the plural forms as well, unless the context clearly indicates otherwise.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

In addition, the phrase "based on" as used herein is meant to be open and inclusive, since a process, step, calculation or other action that is "based on" one or more of the stated conditions or values may, in practice, be based on additional conditions or value exceeding those stated.

FIG. 1 illustrates an exemplary optical communication network 100 based on dense wavelength division multiplexing (DWDM). The optical communication network 100 includes a plurality of reconfigurable optical add-drop multiplexer (ROADM) nodes 101 such as 101a to 101g in FIG. 1. The ROADM node 101 is used to multiplex signals with different wavelengths on a fiber link 102. Local devices such as a transmitter (Tx) and a receiver (Rx) can be coupled to the ROADM node 101 to access to the optical communication network 100, and the Tx and Rx can be integrated into a transceiver (e.g., a coherent receiver). As shown in FIG. 1, a receiver may communicate with a transmitter through ROADM nodes 101d and 101f in the optical communication network 100. ROADM nodes 101 are coupled through an optical multiplex section (OMS) to ensure complete signal transmission. The OMS between the ROADM nodes 101 is formed by alternately connecting optical amplifiers 103 (e.g., erbium-doped fiber amplifiers, EDFAs) and fibers. The optical amplifier 103 is used to compensate for various losses such as fiber loss and other component losses.

Figure 2:
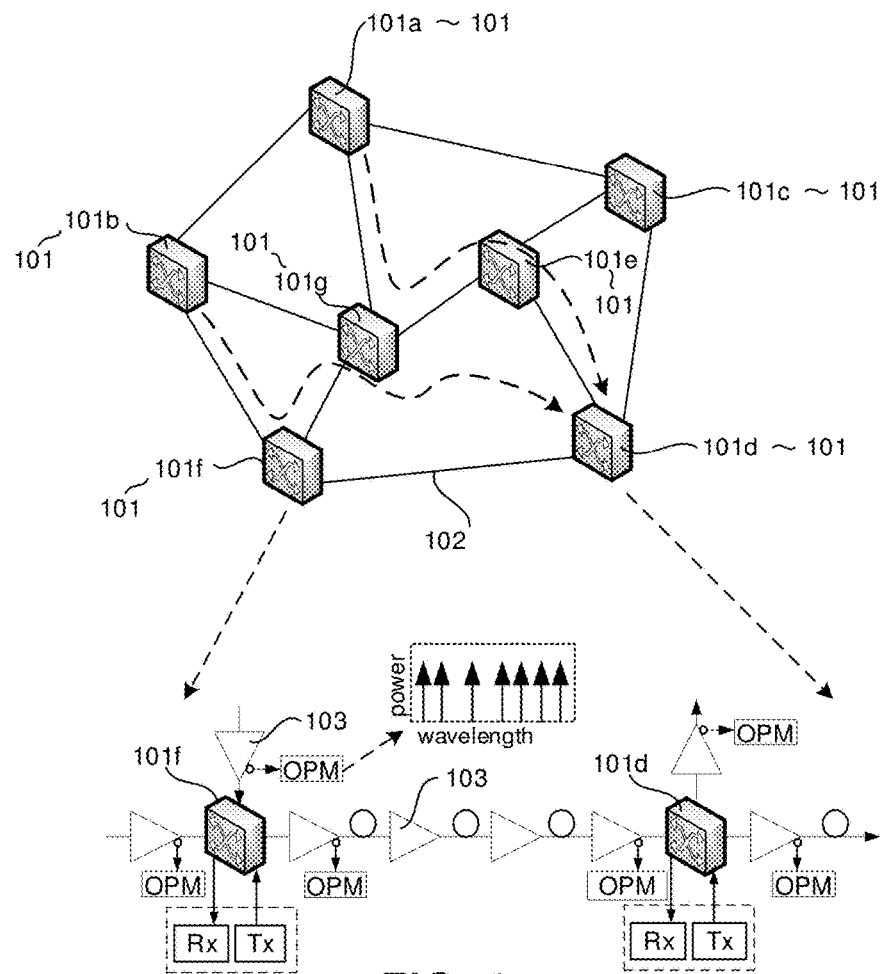
FIG. 2 is an optical communication network in which optical performance monitors (OPMs) are deployed.

In the related art, as shown in FIG. 2, many optical performance monitors (OPMs) are deployed in the fiber link to monitor impairment. The OPM is typically deployed at the output of the optical amplifier 103. In this solution, due to limitations in locations of OPM deployment, the location flexibility of monitoring is not high, and it is impossible to monitor every single location of the entire fiber link; and a large number of OPMs are required, which will increase the cost.

Based on this, embodiments of the present disclosure provide a method for monitoring impairment (such as differential group delay (DGD) or differential modal group delay (DMGD)), applied to monitoring of an optical signal received by a coherent receiver through a fiber link. The method may be performed by a monitor. DGD is a physical quantity that can characterize polarization mode dispersion (PMD), and is one of the important factors in performance degradation. In a spatial division multiplexing (SDM) link, DMGD is introduced by different group velocities during signal propagation of multiple spatial modes of a multimode fiber (MMF). DGD/DMGD may be monitored at receiver (Rx), but it is accumulated DGD/DMGD along the link. Currently there is no method to monitor DGD and DMGD in location resolved manner. However, the method provided in the embodiments of the present disclosure can monitor DGD and DMGD in location resolved manner, which only use the received optical signal, without any monitoring devices located in the middle of fiber link.

Figure 3A:
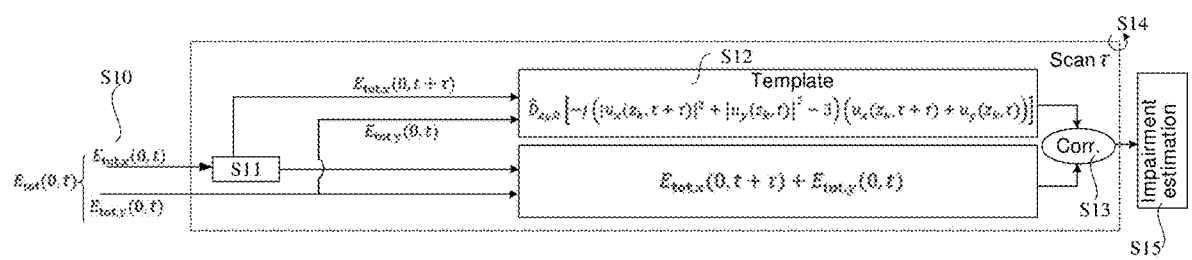
FIG. 3A is a schematic diagram of a method for monitoring impairment, in accordance with some embodiments of the present disclosure.

As shown in FIG. 3A, the method includes steps S10 to S15.

In S10, a first received waveform sent by the coherent receiver (Rx) is received.

The first received waveform may be a waveform at any location on the fiber link, and may include sub-waveforms of x-polarization and y-polarization or sub-waveforms of different spatial modes. The first received waveform is obtained by the Rx based on the optical signal. For example, the first received waveform is obtained by performing chromatic dispersion (CD) and group time delay compensation on the optical signal received by the Rx through the fiber link, and in this case, a digital signal processor (DSP) in the Rx can be used to perform the CD and the group time delay compensation. For another example, the first received waveform is directly obtained based on the optical signal, and a DSP independent of the Rx can be used to perform the CD and the group time delay compensation on the first received waveform to obtain the compensated waveform, which can be used to obtain a second received waveform described below.

Figure 4:
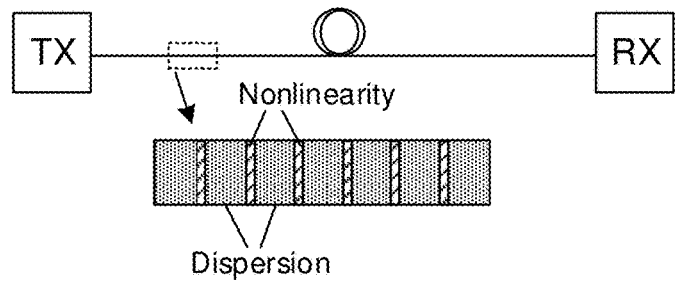
FIG. 4 is a schematic diagram of a section of a fiber in a fiber link.

As shown in FIG. 4, a short section of fiber in a fiber link can be considered as repeated CD and nonlinear operations, which can be represented as:

$$\frac{\partial W}{\partial Z} = (\hat{D} + \hat{N})W \neq (\hat{N} + \hat{D})W.$$

W is an arbitrary waveform, $\hat{D}$ is a dispersion operator (which is a linear operator), and $\hat{N}$ is a nonlinear operator. It can be seen that the operator $\hat{D}$ and the operator $\hat{N}$ are non-permutable. Therefore, the CD process and the nonlinear process caused by the Kerr effect in the fiber link are non-permutable.

A given amount of chromatic dispersion is associated with a given location along the fiber link, and the amount of chromatic dispersion may be representative of a location of the optical signal along the fiber link. For example, given a total amount of chromatic dispersion $CD_{tot}$ detected on the optical signal at the Rx, and given that the fiber link may be partitioned in M segments, an amount of chromatic dispersion linearly accumulated by the optical signal between the Tx (receiving end of the fiber link) and a segment f is $CD_f = f \times \Delta CD$, where $\Delta CD = CD_{tot}/M$, and f and M are both positive integers.

The CD process generates a unique signal waveform to the transmitted signal at each location along the fiber link, and the unique signal waveform generates a unique nonlinear noise at that location. At the Rx, the received signal includes all the nonlinear noises from every location which are all unique, thus the local waveform or local system parameter (e.g., local signal power) can be retrieved at Rx.

Figure 5:
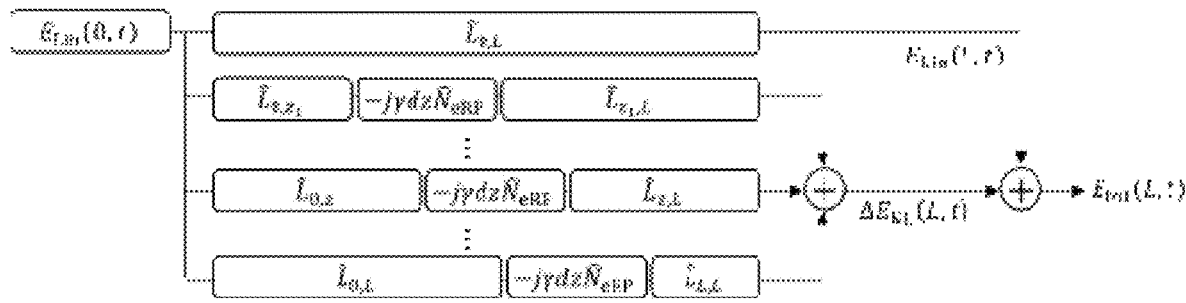
FIG. 5 is an enhanced regular perturbation model, in accordance with some embodiments of the present disclosure.

FIG. 5 illustrates an enhanced regular perturbation (eRP) model provided in embodiments of the present disclosure. The top path is the linear propagation path of the input linear waveform from the Tx (i.e., the receiving end of the fiber link) to the Rx (i.e., the outputting end of the fiber link). In an example where the input linear waveform includes sub-waveforms of x-polarization and y-polarization, the input linear waveform is represented as: $E_{Lin}(0, t) = \sqrt{P_x(0)}u_x(0, t) + \sqrt{P_y(0)}u_y(0, t)$; $P_x(z)$ and $P_y(z)$ are signal powers of x-polarization and y-polarization at location z, respectively; and $u_x(z,t)$ and $u_y(z,t)$ are normalized signal waveforms of the x-polarization and y-polarization at location z and time t, respectively. $\hat{L}_{z_p,z_q} = \hat{\alpha}_{z_p,z_q} \hat{D}_{z_p,z_q}$ is a linear propagation operator that combines the propagation gain/loss and the linear chromatic dispersion operator, where $z_p$ and $z_q$ represent the distances from the Tx, $\hat{\alpha}_{z_p,z_q} \equiv \sqrt{P(z_q)/P(z_p)}$ is the propagation gain/loss operator, and the chromatic dispersion operator $\hat{D}_{z_p,z_q}$ represents adding chromatic dispersion to the waveform for the amount of the distance from location $z_p$ to $z_q$. $\hat{D}_{z_p,z_q} \equiv \hat{F}^{-1} \tilde{D}_{z_p,z_q}(\omega)\hat{F}$, where $\hat{F}$ is the Fourier transform operator, $$\tilde{D}_{z_p,z_q}(\omega) \equiv \exp\left(-j\left(\frac{\omega^2}{2}\int_{z_p}^{z_q}\beta_2(z)dz + \frac{\omega^3}{6}\int_{z_p}^{z_q}\beta_3(z)dz\right)\right),$$

and ω is the angular frequency. Therefore, the linear waveform at the Rx (z=L) becomes $E_{Lin}(L,t)=\hat{L}_{0,L}E_{Lin}(0, t)$. In the case where the input linear waveform includes the sub-waveforms of x-polarization and y-polarization, $E_{Lin}(L,t)=\hat{L}_{0,L}E_{Lin}(0, t)=\sqrt{P_x(L)}u_x(L,t)+\sqrt{P_y(L)}u_y(L,t)$.

Other paths are partial nonlinear paths that generate local nonlinear noises. For example, the nonlinear noise of the location $z_1$ may be generated by the linear propagation from the Tx (location 0) to the location $z_1$ on the fiber link, the nonlinear operation, and then the linear propagation from the location $z_1$ to the Rx (location L) on the fiber link. The nonlinear noise of the location $z_1$ may be represented as $-j\gamma dz\hat{L}_{z_1,L}\hat{N}_{eRP}\hat{L}_{0,z_1}E_{Lin}(0, t)$. Here, $-j\gamma dz\hat{N}_{eRP}$ is the nonlinear operation, where j is the imaginary unit of the complex number, γ is the nonlinear coefficient, and $\hat{N}_{eRP}$ is the nonlinear operator based on the eRP model which is given as $\hat{N}_{eRP}=(|\cdot|^2-1.5\times\langle|\cdot|^2\rangle)(\cdot)$. It will be noted that the nonlinear operator $\hat{N}_{eRP}$ can be used for both dual-pol DGD and 2-mode DMGD. For multi-mode DMGD, the change will be the factor 1.5.

According to the eRP model, the total received waveform at the Rx (outputting end of the fiber link) may be represented as:

$E_{tot}(L,t)=E_{Lin}(L,t)+\Delta E_{NL}(L,t)=E_{Lin}(L,t)+\int_0^L -j\gamma\hat{L}_{z,L}$ $\hat{N}_{eRP}\hat{L}_{0,z}E_{Lin}(0, t)dz$, where $\Delta E_{NL}(L,t)$ represents the nonlinear noise waveform at the location L.

Based on this, when the first received waveform is a CD compensated waveform, the first received waveform may be represented as $E_{tot}(0, t)$. In this case, it is only necessary to simply adjust CD amount to make the final location to Tx (z=0). It will be noted that FIG. 3A illustrates an example where the first received waveform is the CD compensated waveform.

Of course, by adjusting CD amount, the first received waveform may be a waveform at any location on the fiber link, and may be represented as $E_{tot}(\zeta,t)$. ζ indicates a location on the fiber link. The location ζ indicates a location of CD accumulation.

In S11, the second received waveform is obtained according to the first received waveform, and the second received waveform includes a first sub-waveform (which is represented as $E_{tot,x}(0, t+\tau)$ in FIG. 3A) and a second sub-waveform (which is represented as $E_{tot,y}(0, t)$ in FIG. 3A) with a relative first delay therebetween.

The first delay is a group delay between the first sub-waveform and the second sub-waveform. The first delay may be a relative time delay of the second sub-waveform with respect to the first sub-waveform due to group velocity difference. Of course, the first delay may also be a relative time delay of the first sub-waveform with respect to the second sub-waveform due to group velocity difference.

Generally, the group delay generated during the transmission of the optical signal is compensated by the DSP. In this case, if the compensated waveform is directly used to perform subsequent steps, it will result in inaccurate results. Thus, there is a need to mimic the group delay in the link in order to finally obtain the location dependent group delay (i.e., impairment).

Figure 3B:
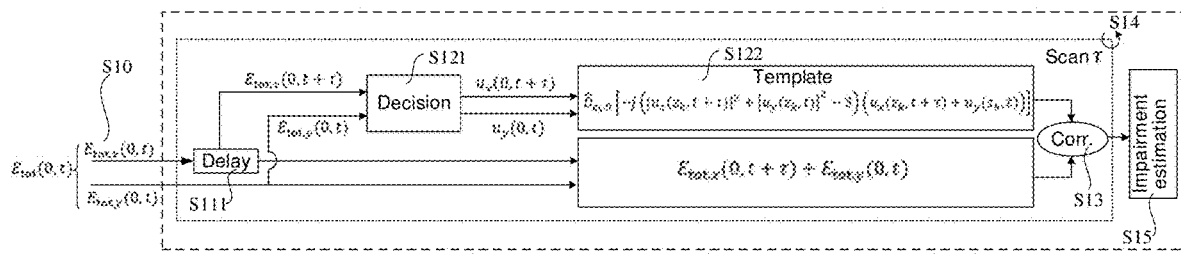
FIG. 3B is a schematic diagram of another method for monitoring impairment, in accordance with some embodiments of the present disclosure.

In this case, as shown in FIG. 3B, if the first received waveform is a waveform with the delay compensation, the first received waveform including a first initial sub-waveform (which is represented as $E_{tot,x}(0, t)$ in FIG. 3B) and a second initial sub-waveform (which is represented as $E_{tot,y}(0, t)$ in FIG. 3B), obtaining the second received waveform according to the first received waveform in S11 includes step S111.

In S111, the first delay is added to one of the first initial sub-waveform and the second initial sub-waveform to obtain the first sub-waveform and the second sub-waveform, respectively. By adding the first delay to one of the first initial sub-waveform and the second initial sub-waveform, there is the first delay between the two sub-waveforms of the obtained second received waveform.

In some embodiments, the first sub-waveform and the second sub-waveform are an x-polarization sub-waveform and a y-polarization sub-waveform, respectively. The x-polarization sub-waveform is represented as $E_{tot,x}(\zeta,t+\tau)$, the y-polarization sub-waveform is represented as $E_{tot,y}(\zeta,t)$, and the second received waveform $E_{tot}(\zeta,t,\tau)=E_{tot,x}(\zeta,t+\tau)+E_{tot,y}(\zeta,t)$. τ represents the first delay. It can be understandable that, according to the eRP model, $E_{tot,x}(\zeta,t+\tau)=E_{Lin,x}(\zeta,t+\tau)+\Delta E_{NL,x}(\zeta,t+\tau)$, $E_{tot,y}(\zeta,t)=E_{Lin,y}(\zeta,t)+\Delta E_{NL,y}(\zeta,t)$.

In some other embodiments, the first sub-waveform and the second sub-waveform are the y-polarization sub-waveform and the x-polarization sub-waveform, respectively. The x-polarization sub-waveform is represented as $E_{tot,x}(\zeta,t)$, the y-polarization sub-waveform is represented as $E_{tot,y}(\zeta,t+\tau)$, and the second received waveform $E_{tot}(\zeta,t,\tau)=E_{tot,x}(\zeta,t)+E_{tot,y}(\zeta,t+\tau)$.

In yet some other embodiments, the first sub-waveform and the second sub-waveform are sub-waveforms of a second spatial mode and a first spatial mode, respectively. The sub-waveform of the first spatial mode is represented as $E_{tot,1}(\zeta,t)$, the sub-waveform of the second spatial mode is represented as $E_{tot,2}(\zeta,t+\tau)$, and the second received waveform $E_{tot}(\zeta,t,\tau)=E_{tot,1}(\zeta,t)+E_{tot,2}(\zeta,t+\tau)$. It can be understandable that, according to the eRP model, $E_{tot,1}(\zeta,t)=E_{Lin,1}(\zeta,t)+\Delta E_{NL,1}(\zeta,t)$, $E_{tot,2}(\zeta,t+\tau)=E_{Lin,2}(\zeta,t+\tau)+\Delta E_{NL,2}(\zeta,t+\tau)$.

In S12, a template at a predetermined location on the fiber link is obtained according to the second received waveform. The template is used for representing a nonlinear noise by a first sub-signal waveform (which is represented as $u_x(z_k,t+\tau)$ in FIG. 3A) and a second sub-signal waveform (which is represented as $u_y(z_k,t)$ in FIG. 3A) at the predetermined location, and the first sub-signal waveform and the second sub-signal waveform are respectively obtained from the first sub-waveform and the second sub-waveform and have the first delay therebetween.

It will be noted that the predetermined location may be any selected location on the fiber link.

From the signal propagation model which has parallel propagation of the nonlinear noise, it is possible to generated nonlinear noise of a single location. This nonlinear noise can be used as the template for a correlation with the second received waveform.

In some embodiments, as shown in FIG. 3B, obtaining the template at the predetermined location on the fiber link according to the second received waveform in S12 includes steps S121 and S122.

In S121, a third sub-signal waveform (which is represented as $u_x(0, t+\tau)$ in FIG. 3B) is obtained through decision according the first sub-waveform of the second received waveform, and a fourth sub-signal waveform (which is represented as $u_y(0, t)$ in FIG. 3B) is obtained through decision according the second sub-waveform of the second received waveform.

S122, the template at the predetermined location on the fiber link is obtained, the first sub-signal waveform and the second sub-signal waveform are obtained from the third sub-signal waveform and the fourth sub-signal waveform, respectively.

When the third sub-signal waveform and the fourth sub-signal waveform are obtained through decision, the first sub-signal waveform and the second sub-signal waveform at the predetermined location used for representing the nonlinear noise can be obtained by adjusting CD amount.

Since the template is prepared according to the location, any impairment that affects the waveform at that location may be retrieved based on the optical signal received at the Rx.

According to the eRP model shown in FIG. 5, in an example where the local nonlinear noise is generated from x-polarization and y-polarization, an initial template is represented as:

$$\Delta u_{z_k}(L, t) = -j\hat{D}_{z_k,L}\hat{N}_{eRP}\hat{D}_{0,z_k}(u_x(0, t) + u_y(0, t)) =$$
$$\hat{D}_{z_k,L}\left[-j(|u_x(z_k, t)|^2 + |u_y(z_k, t)|^2 - 3)(u_x(z_k, t) + u_y(z_k, t))\right].$$

The subscript $z_k$ denotes the predetermined location of the template.

On this basis, time delay (i.e., DGD) at the predetermined location is also included in the nonlinear noise, thus the template can be obtained based on the initial template, and can be represented as:

$$\Delta u_{z_k}(L, t, \tau) = -j\hat{D}_{z_k,L}\hat{N}_{eRP}\hat{D}_{0,z_k}(u_x(0, t+\tau) + u_y(0, t)) =$$
$$\hat{D}_{z_k,L}\left[-j(|u_x(z_k, t+\tau)|^2 + |u_y(z_k, t)|^2 - 3)(u_x(z_k, t+\tau) + u_y(z_k, t))\right].$$

$\tau$ is DGD at the predetermined location $z_k$, i.e., the first delay.

The above description is the process of obtaining the template based on x-polarization and y-polarization, and the template obtained based on the first spatial mode and the second spatial mode is the same as above.

It will be noted that, in the above template, the location of CD accumulation is assumed at Rx (z=L). In practical applications, the location of CD accumulation can be any location (z=ζ) on the fiber link by adjusting CD amount, thus the template in the embodiments of the present disclosure is represented as:

$$\Delta u_{z_k}(\zeta, t, \tau) = -j\hat{D}_{z_k,\zeta}\hat{N}_{eRP}\hat{D}_{0,z_k}(u_1(0, t+\tau) + u_2(0, t)) =$$
$$\hat{D}_{z_k,\zeta}\left[-j(|u_1(z_k, t+\tau)|^2 + |u_2(z_k, t)|^2 - 3)(u_1(z_k, t+\tau) + u_2(z_k, t))\right].$$

Where $\Delta u_{z_k}(\zeta,t,\tau)$ is the template prepared for the predetermined location $z_k$; $\hat{D}_{z_k,\zeta}$ represents CD from the predetermined location $z_k$ to location ζ on the fiber link, and the location ζ is any location on the fiber link and matches with the first received waveform; $\hat{D}_{0,z_k}$ represents CD from location 0 to the predetermined location $z_k$ on the fiber link; $u_1(0, t+\tau)$ represents that $u_1(0, t)$ has the first delay $\tau$ with respect to $u_2(0, t)$, $u_1(0, t)$ and $u_2(0, t)$ are normalized signal waveforms at location 0 and time t obtained from the first sub-waveform and the second sub-waveform of the second received waveform, respectively; $u_1(z_k,t+\tau)$ and $u_2(z_k,t)$ represent the first sub-signal waveform and the second sub-signal waveform at the predetermined location $z_k$, respectively; j is an imaginary unit of a complex number; $\hat{N}_{eRP}$ represents a nonlinear operator based on an enhanced regular perturbation (eRP) model.

Since the first delay is a relative time delay, the template in the embodiments of the present disclosure may also be represented as:

$$\Delta u_{z_k}(\zeta, t, \tau) = -j\hat{D}_{z_k,\zeta}\hat{N}_{eRP}\hat{D}_{0,z_k}(u_1(0, t) + u_2(0, t+\tau)) =$$
$$\hat{D}_{z_k,\zeta}\left[-j(|u_1(z_k, t)|^2 + |u_2(z_k, t+\tau)|^2 - 3)(u_1(z_k, t) + u_2(z_k, t+\tau))\right].$$

In the case where the first sub-waveform and the second sub-waveform are the x-polarization waveform and y-polarization waveform, $u_x(0, t+\tau)$ is used instead of $u_1(0,t+\tau)$, and $u_y(0, t)$ is used instead of $u_2(0, t)$; or $u_x(0, t)$ is used instead of $u_1(0, t)$, and $u_y(0, t+\tau)$ is used instead of $u_2(0, t+\tau)$.

In S13, a correlation between the second received waveform and the template is obtained.

In some embodiments, the correlation is represented as: $CR(E_{tot}(\zeta,t,\tau),\Delta u_z(\zeta,t,\tau))=\int_0^L \gamma P(z)g(z_k-z)dz \equiv \gamma P(z_k)L_{CR}(z_k)$.

Where $CR(A(t),B(t)) \equiv \langle A(t)B^*(t) \rangle$, which represents correlation calculation between A(t) and B(t); $\langle \cdot \rangle$ represents time average operation; $E_{tot}(\zeta,t,\tau)$ represents the second received waveform; γ represents a nonlinear coefficient; $L_{CR}(z)$ is an effective correlation length at location z, $$L_{CR}(z_k) \equiv \int_0^L \frac{P(z)}{P(z_k)}g(z_k - z)dz;$$

$g(z_k-z) \equiv CR(\Delta u_{z_k}(\zeta,t,\tau),\Delta u_z(\zeta,t,\tau))$ is a spatial response function which represents the similarity of nonlinear noises at two locations $z_k$ and z; $P(z_k)$ represents the signal power at the predetermined location $z_k$; P(z) represents a signal power at location z, and the location z is any location on the fiber link.

In the above correlation, the resulted power is convoluted with spatial response $g(z_k-z)$, which is determined by dispersion coefficient of propagating fiber and signal baud rate. Thus, in order to obtain true power profile, it requires scaling by γ and $L_{CR}$.

In S14, a value of the first delay is changed to obtain values of the correlation corresponding to different values of the first delay.

That is, when τ takes different values, values of the correlation corresponding to different values of τ are obtained.

In S15, a value of the first delay corresponding to a maximum value of the correlation is output as impairment estimation.

The location $z_k$ as an example, the maximum correlation is obtained when the value of the first delay matches with the local DGD/DMGD (i.e., $\tau=\tau_{z_k}$), and the correlation drops when τ mismatches with respect to the $\tau_{z_k}$. By scanning τ, the value of the first delay resulting maximum correlation, i.e., the local DGD/DMGD can be obtained.

In the method for monitoring impairment provided in the embodiments of the present disclosure, after the first received waveform is obtained, the second received waveform including the first sub-waveform and the second sub-waveform with a relative first delay therebetween is obtained based on the first received waveform. Next, the correlation between the second received waveform and the template at the predetermined location on the fiber link is obtained, the template is used for representing a nonlinear noise by a first sub-signal waveform and a second sub-signal waveform at the predetermined location that are respectively obtained from the first sub-waveform and the second sub-waveform and have the first delay therebetween. On this basis, by changing a value of the first delay, values of the correlation corresponding to different values of the first delay can be obtained. In this way, the value of the first delay corresponding to the maximum correlation can be used as the local DGD/DMGD, thereby achieving monitoring of impairment for any predetermined location on the fiber link only through the received optical signal on the fiber link. In addition, since there's no need to provide additional monitoring devices in the fiber link, the costs may also be reduced.

Figure 3C:
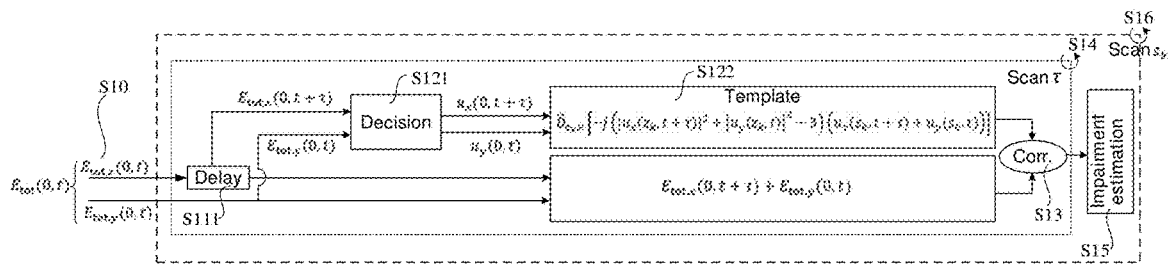
FIG. 3C is a schematic diagram of yet another method for monitoring impairment, in accordance with some embodiments of the present disclosure.

In some embodiments, as shown in FIG. 3C, the method further includes step S16.

In S16, each location on the fiber link is traversed to obtain values of the correlation corresponding to each location on the fiber link, and to output a value of the first delay corresponding to a maximum value of the correlation for each location.

That is, the value of the first delay corresponding to the maximum correlation can be obtained for each location.

By repeating the correlation operation for all locations, a longitudinal (location-resolved) impairment monitoring may be achieved only through the received optical signal on the fiber link.

The method proposed in the embodiments of the present disclosure is verified below through simulations by taking DGD as an example, and the method is performed by the DGD monitor.

Figure 6:
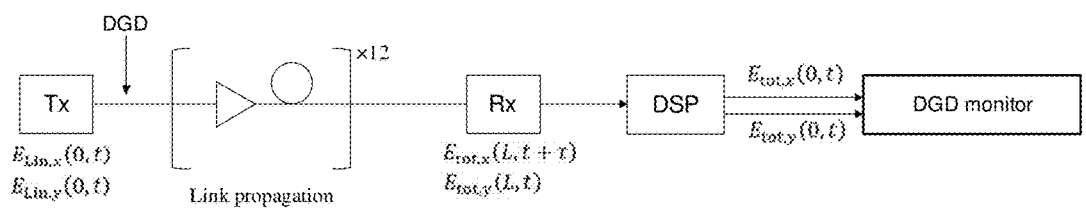
FIG. 6 is an experimental setup for longitudinal DGD monitoring.

For an experimental verification of the local DGD monitoring, an experiment is performed as presented in FIG. 6 under the conditions:

12×75 km standard single mode fiber (SSMF) fiber spans;
dual polarization-quadrature phase shift keying (DP-QPSK) 68-Gbaud transmission signal;
using commercial TRx (analog-to digit converter (ADC) buffer data).

Artificial DGD is applied at Tx in 12-span configuration. The DGD varies from 0 ps to 30 ps in 5 ps steps. After link propagation, the signal is captured by Rx ADC buffer, and extracted for DSP. The output signal of DSP, $E_{tot}(0, t)$, is fed into DGD monitor, where $E_{tot}(0, t)=E_{tot,x}(0, t)+E_{tot,y}(0, t)$.

Figure 7A:
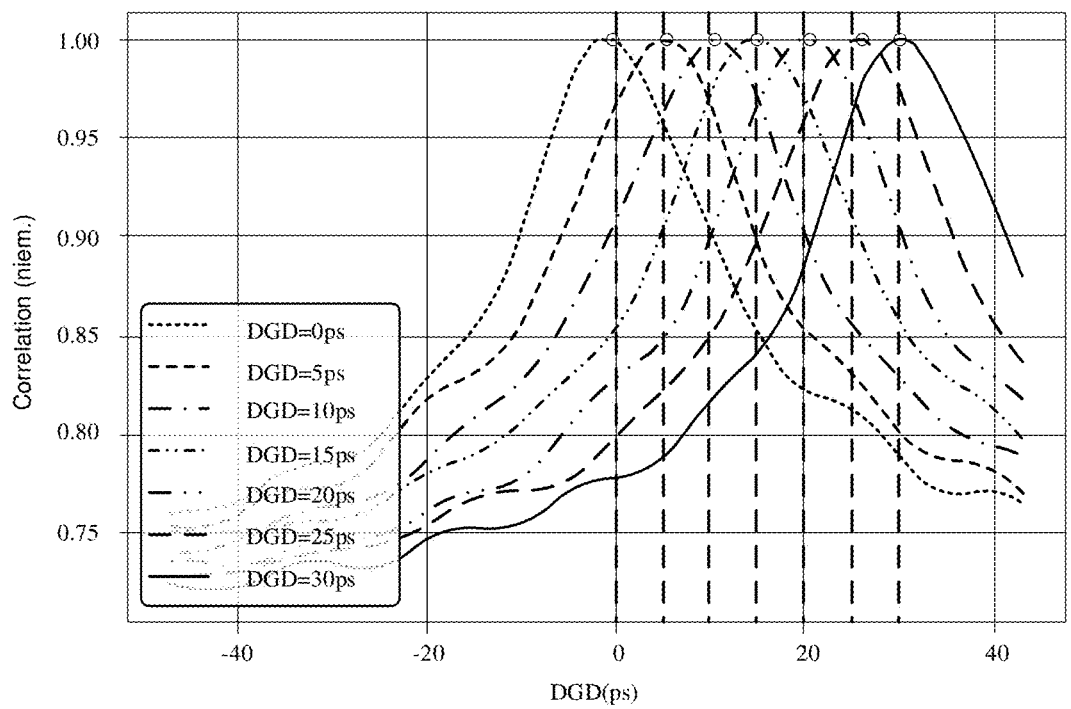
FIGS. 7A and 7B are experimental results of DGD monitoring.
Figure 7B:
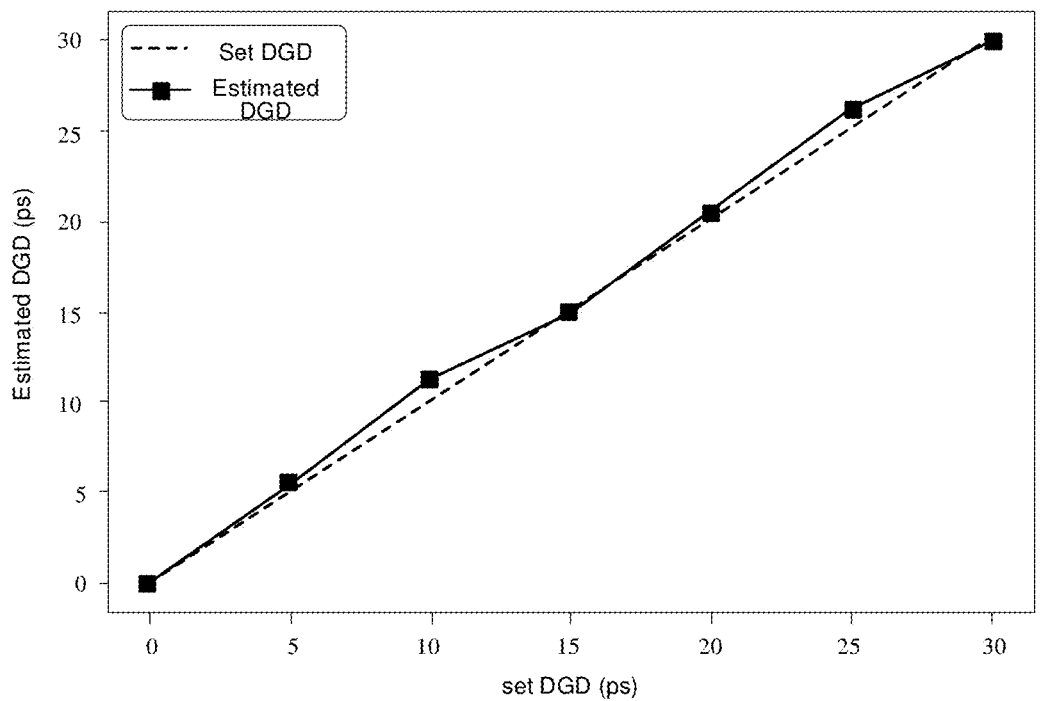

FIGS. 7A and 7B show experimental estimation of set DGD. FIG. 7A shows the correlation values while scanning the first delay τ. The set-DGDs are presented as vertical dashed lines, and the curves show the correlation curves corresponding to the set-DGDs. The estimated DGD can be obtained by taking the applied time delay at the maximum correlation. And in FIG. 7B, the estimated DGD is shown as the solid curve, and the dashed curve represents the set-DGD.

Figure 8:
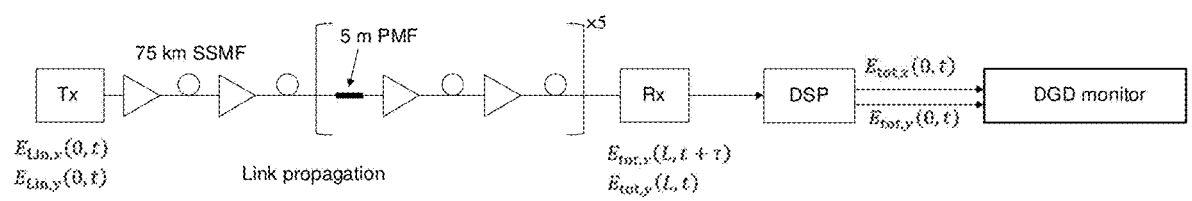
FIG. 8 is another experimental setup for longitudinal DGD monitoring.

For an experimental verification of the longitudinal DGD estimation, an experiment is performed as presented in FIG. 8 under the conditions:

12×75 km SSMF fiber spans;
DP-QPSK 68-Gbaud transmission signal;
using commercial TRx (ADC buffer data).
inserting 5 m polarization maintaining fiber (PMF) in every 2 spans to generate local DGD.

PMFs (5 m each) are inserted in every 2 spans in the link. The DGD of the inserted PMF is ~8 ps when the state of polarization (SOP) is well aligned. The actual local DGD can be −8 to +8 ps depending on the SOP at each PMF input. After link propagation, the signal is captured by Rx ADC buffer, and extracted for DSP. The output signal of DSP, $E_{tot}(0, t)$, is fed into DGD monitor, where $E_{tot}(0, t)=E_{tot,x}(0, t)+E_{tot,y}(0, t)$.

Figure 9:
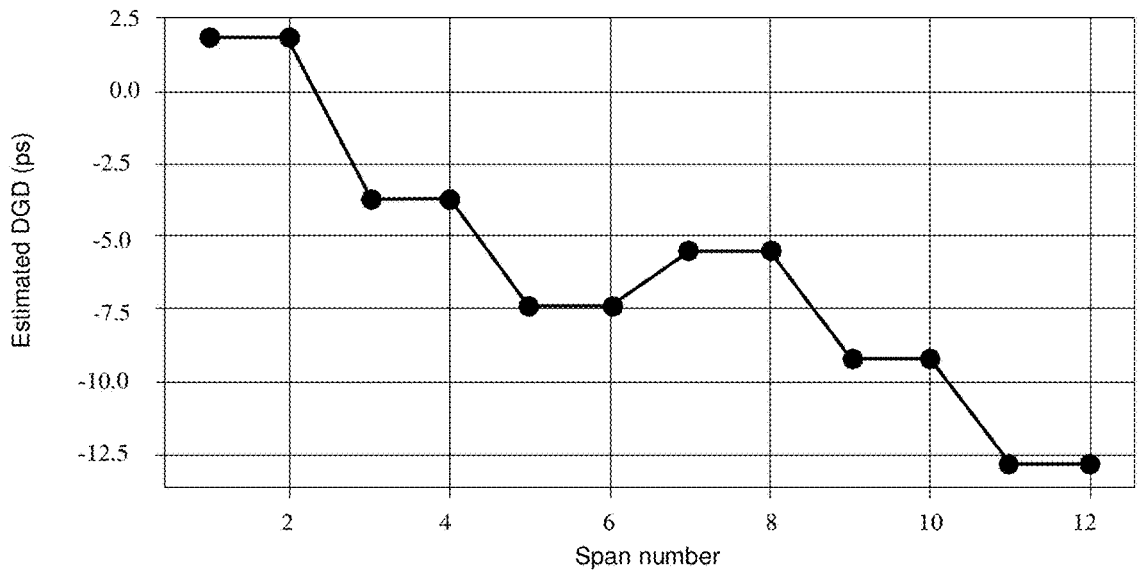
FIG. 9 is an experimental result of an estimated longitudinal DGD.

FIG. 9 shows experimental estimation of the longitudinal DGD. The local DGD detection shown in FIG. 9 is performed at each span input location, and the estimated DGD is plotted as a function of span number. It is clearly shown that the estimated DGD is changed in every 2 spans and DGD is maintained within 2 spans, which corresponds to the experimental condition of the local DGD distribution. Also, the DGD changes in every 2 spans are within the DGD range that the PMF can provide, which also supports that the local DGD is well monitored.

The above mainly describes DGD monitoring from the perspectives of x-polarization and y-polarization, which is also applicable to DMGD of multiple spatial modes.

Figure 10:
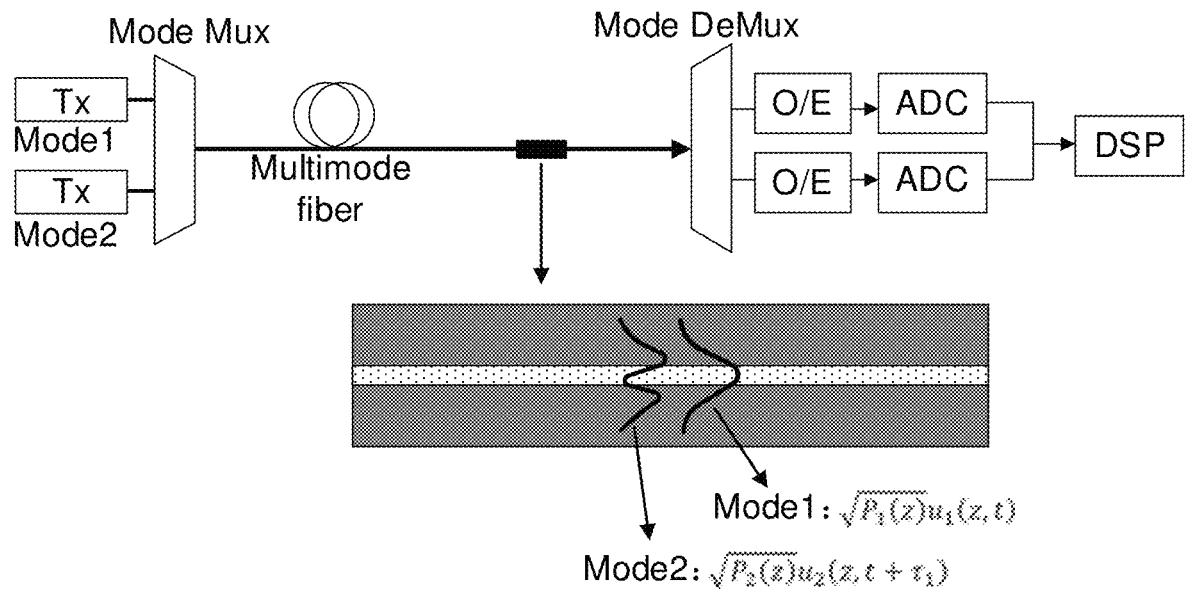
FIG. 10 is a schematic diagram of a spatial division multiplexing (SDM) link with multiple spatial mode propagation in multimode fiber.

As shown in FIG. 10, a multimode fiber (MMF) in a spatial division multiplexing (SDM) link supports propagation of multiple spatial modes having different group velocities, which leads DMGD. FIG. 10 only illustrates two spatial modes, but the number of modes is not limited for this method.

In the case of two spatial modes, the second received waveform is $E_{tot}(\zeta,t,\tau)=E_{tot,1}(\zeta,t)+E_{tot,2}(\zeta,t+\tau_1)$, the template is $\Delta u_{z_k}(\zeta,t,\tau_1)=-j\hat{D}_{z_k,\zeta}\hat{N}_{eRP}\hat{D}_{0,z_k}(u_1(0, t)+u_2(0, t+\tau_1))=\hat{D}_{z_k,\zeta}[-j(|u_1(z_k,t)|^2+|u_2(z_k,t+\tau_1)|^2-3)(u_1(z_k,t)+u_2(z_k,t+\tau_1))]$, where $\tau_1$ is the first delay (that is, $\tau_1=\tau$).

In the case of more than two spatial modes, the second received waveform further includes at least one sub-waveform in addition to the first sub-waveform and the second sub-waveform, spatial modes of all sub-waveforms of the second received waveform are different, and there is a relative delay between the first sub-waveform and any sub-waveform except for the first sub-waveform of the second received waveform; and the nonlinear noise at the predetermined location is also represented by at least one sub-signal waveform at the predetermined location that is obtained from the at least one sub-waveform of the second received waveform.

In this case, for example, the second received waveform is represented as: $E_{tot}(\zeta,t,\tau_1, \ldots, \tau_{i-1})=E_{tot,1}(\zeta,t)+E_{tot,2}(\zeta, t+\tau_1)+ \ldots +E_{tot,i}(\zeta,t+\tau_{i-1})$, where $E_{tot,1}(\zeta,t)$ represents the first sub-waveform with the first spatial mode, $E_{tot,2}(\zeta,t+\tau_1)$ represents the second sub-waveform with the second spatial mode, and $E_{tot,i}(\zeta,t+\tau_{i-1})$ represents any sub-waveform except for the first sub-waveform and the second sub-waveform. i is a positive integer and takes a value from 3.

For example, i is equal to 3, $E_{tot}(\zeta,t,\tau_1,\tau_2)=E_{tot,1}(\zeta,t)+E_{tot,2}(\zeta,t+\tau_1)+E_{tot,3}(\zeta,t+\tau_2)$. For another example, i is equal to 4, $E_{tot}(\zeta,t,\tau_1,\tau_2,\tau_3)=E_{tot,1}(\zeta,t)+E_{tot,2}(\zeta,t+\tau_1)+E_{tot,3}(\zeta,t+\tau_2)+E_{tot,4}(\zeta,t+\tau_3)$. $\tau_2$ is a second delay, and $\tau_3$ is a third delay.

In the case of more than two spatial modes, the template is represented as: $\Delta u_{z_k}(\zeta,t,\tau_1, \ldots ,\tau_{i-1})=-j\hat{D}_{z_k,\zeta}\hat{N}_{eRP}\hat{D}_{0,z_k}(u_1(0, t)+u_2(0, t+\tau_1)+ \ldots +u_i(0, t+\tau_{i-1}))$. Where $u_2(0, t+\tau_1)$ represents that $u_2(0, t)$ has the first delay $\tau_1$ with respect to $u_1(0, t)$, $u_1(0, t)$ and $u_2(0, t)$ are normalized signal waveforms of the first spatial mode and the second spatial mode at location 0 and time t, respectively; $u_i(0, t+\tau_{i-1})$ represents that $u_i(0, t)$ has a delay $\tau_{i-1}$ with respect to $u_1(0, t)$, $u_i(0, t)$ is a normalized signal waveform of any spatial mode except for the first spatial mode and the second spatial mode in the spatial modes of all sub-waveforms of the second received waveform at location 0 and time t; j is an imaginary unit of a complex number; $\hat{N}_{eRP}$ represents a nonlinear operator based on the eRP model, $\hat{N}_{eRP}\equiv(|\cdot|^2-m\times\langle|\cdot|^2\rangle)(\cdot)$, and m is related to the number of the spatial modes. And the correlation is represented as: $CR(E_{tot}(\zeta,t,\tau_1, \ldots ,\tau_{i-1}),\Delta u_{z_k}(\zeta,t,\tau_1, \ldots ,\tau_{i-1}))=\int_0^L\gamma P(z)g(z_k-z)dz\equiv\gamma P(z_k)L_{CR}(z_k)$.

With considering two spatial modes, a total linear signal waveform at location ζ and time t can be represented as $\sqrt{P_1(\zeta)}u_1(\zeta,t)+\sqrt{P_2(\zeta)}u_2(\zeta,t+\tau_1)$, and the local nonlinear noise at location ζ and time t is $[(P_1(\zeta)|u_1(\zeta,t)|^2+P_2(\zeta)|u_2(\zeta,t+\tau_1)|^2)-1.5\times\langle|\sqrt{P_1(\zeta)}u_1(\zeta,t)+\sqrt{P_2(\zeta)}u_2(\zeta,t+\tau_1)|^2\rangle](\sqrt{P_1(\zeta)}u_1(\zeta,t)+\sqrt{P_2(\zeta)}u_2(\zeta,t+\tau_1))$. $P_1(\zeta)$ and $P_2(\zeta)$ are signal powers of the first spatial mode and the second spatial mode at location $\zeta$, respectively; $u_2(\zeta,t+\tau_1)$ represents that $u_2(\zeta,t)$ has the first delay $\tau_1$ with respect to $u_1(\zeta,t)$, and $u_1(\zeta,t)$ and $u_2(\zeta,t)$ are normalized signal waveforms of the first spatial mode and the second spatial mode at the location $\zeta$ and time t, respectively.

The spatial mode dependent power ($P_1(\zeta)$, $P_2(\zeta)$) can be monitored by generating the template with monitored DMGD, because the nonlinear noise includes the mode dependent power.

With considering more than two spatial modes, a total linear signal waveform at location $\zeta$ and time t can be represented as $\sqrt{P_1(\zeta)}u_1(\zeta,t)+\sqrt{P_2(\zeta)}u_2(\zeta,t+\tau_1)+\ldots+\sqrt{P_i(\zeta)}u_i(\zeta,t+\tau_{i-1})$. $P_i(\zeta)$ is a signal power of any spatial mode different form the first spatial mode and the second spatial mode at the location $\zeta$; $u_i(\zeta,t+\tau_{i-1})$ represents that $u_i(\zeta,t)$ has a delay $\tau_{i-1}$ with respect to $u_1(\zeta,t)$, and $u_i(\zeta,t)$ is a normalized signal waveform of any spatial mode different form the first spatial mode and the second spatial mode at the location $\zeta$ and time t; i is a positive integer and takes a value from 3.

Figure 11:
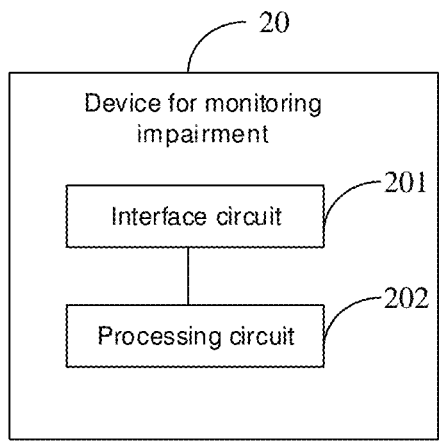
FIG. 11 is a schematic diagram of a device for monitoring impairment, in accordance with some embodiments of the present disclosure.

Embodiments of the present disclosure provide a device for monitoring impairment, which is applied to monitoring of an optical signal received by a coherent receiver through a fiber link. As shown in FIG. 11, the device 20 includes an interface circuit 201 and a processing circuit 202.

The interface circuit 201 is used to receive a first received waveform.

The processing circuit 202 is coupled to the interface circuit 201. The processing circuit 202 is used to: obtain a second received waveform according to the first received waveform, the second received waveform including a first sub-waveform and a second sub-waveform with a relative first delay therebetween; obtain a template at a predetermined location on the fiber link according to the second received waveform, the template being used for representing a nonlinear noise by a first sub-signal waveform and a second sub-signal waveform at the predetermined location that are respectively obtained from the first sub-waveform and the second sub-waveform and have the first delay therebetween; obtain a correlation between the second received waveform and the template; change a value of the first delay to obtain values of the correlation corresponding to different values of the first delay; and output a value of the first delay corresponding to a maximum value of the correlation as impairment estimation.

In the device 20 for monitoring impairment provided in the embodiments of the present disclosure, after the interface circuit 201 obtains the first received waveform, the processing circuit 202 obtains the second received waveform including the first sub-waveform and the second sub-waveform with a relative first delay therebetween based on the first received waveform. Next, the processing circuit 202 obtains the correlation between the second received waveform and the template at the predetermined location on the fiber link, the template is used for representing a nonlinear noise by a first sub-signal waveform and a second sub-signal waveform at the predetermined location that are respectively obtained from the first sub-waveform and the second sub-waveform and have the first delay therebetween. On this basis, by changing a value of the first delay, values of the correlation corresponding to different values of the first delay are obtained by the processing circuit 202, and then a value of the first delay corresponding to a maximum value of the correlation is output. In this way, the value of the first delay corresponding to the maximum correlation can be used as the local DGD/DMGD, thereby achieving monitoring of impairment for any predetermined location on the fiber link only through the received optical signal on the fiber link. In addition, since there's no need to provide additional monitoring devices in the fiber link, the costs may also be reduced.

In some embodiments, the processing circuit 202 is further used to traverse each location on the fiber link to obtain values of the correlation corresponding to each location on the fiber link, and to output a value of the first delay corresponding to a maximum value of the correlation for each location. Therefore, a longitudinal (location-resolved) impairment monitoring may be achieved only through the received optical signal on the fiber link.

In some embodiments, the first received waveform is a waveform with delay compensation, and the first received waveform includes a first initial sub-waveform and a second initial sub-waveform; and the processing circuit 202 is used to add the first delay to one of the first initial sub-waveform and the second initial sub-waveform to obtain the first sub-waveform and the second sub-waveform, respectively.

In some embodiments, the processing circuit 202 is used to: obtain a third sub-signal waveform through decision according the first sub-waveform of the second received waveform, and obtain a fourth sub-signal waveform through decision according the second sub-waveform of the second received waveform; and obtain the template at the predetermined location on the fiber link, the first sub-signal waveform and the second sub-signal waveform being obtained from the third sub-signal waveform and the fourth sub-signal waveform, respectively.

The Template is Represented as:

$$\Delta u_{z_k}(\zeta, t, \tau) = -j\hat{D}_{z_k,\zeta}\hat{N}_{eRP}\hat{D}_{0,z_k}(u_1(0,t) + u_2(0,t)) =$$
$$\hat{D}_{z_k,\zeta}[-j(|u_1(z_k, t+\tau)|^2 + |u_2(z_k,t)|^2 - 3)(u_1(z_k, t+\tau) + u_2(z_k,t))].$$

Where $\Delta u_{z_k}(\zeta,t,\tau)$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform; $\hat{D}_{0,z_k}$ represents CD from location 0 to the predetermined location $z_k$ on the fiber link; $u_1(0, t+\tau)$ represents that $u_1(0, t)$ has the first delay $\tau$ with respect to $u_2(0, t)$, $u_1(0, t)$ and $u_2(0, t)$ are normalized signal waveforms at location 0 and time t obtained from the first sub-waveform and the second sub-waveform of the second received waveform, respectively; $u_1(z_k,t+\tau)$ and $u_2(z_k, t)$ represent the first sub-signal waveform and the second sub-signal waveform at the predetermined location $z_k$, respectively; j is an imaginary unit of a complex number; $\hat{N}_{eRP}$ represents a nonlinear operator based on an enhanced regular perturbation (eRP) model, $\hat{N}_{eRP} \equiv (|\cdot|^2 - 1.5 \times \langle |\cdot|^2 \rangle)(\cdot)$.

The Correlation is Represented as:

$$CR(E_{tot}(\zeta,t,\tau), \Delta u_{z_k}(\zeta,t,\tau)) = \int_0^L \gamma P(z)g(z_k - z)dz \equiv \gamma P(z_k)L_{CR}(z_k).$$

Where $CR(A(t),B(t)) \equiv \langle A(t)B^*(t)\rangle$, which represents correlation calculation between A(t) and B(t); $\langle \cdot \rangle$ represents time average operation; $E_{tot}(\zeta,t,\tau)$ represents the second received waveform; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z) dz;$$

$g(z_k-z) \equiv CR(\Delta u_{z_k}(\zeta,t,\tau), \Delta u_z(\zeta,t,\tau))$ represents a spatial response function; $P(z_k)$ represents the signal power at the predetermined location $z_k$; $P(z)$ represents a signal power at location z, and the location z is any location on the fiber link.

In some examples, the first sub-waveform and the second sub-waveform are an x-polarization sub-waveform and a y-polarization sub-waveform, respectively; the x-polarization sub-waveform is represented as $E_{tot,x}(\zeta,t+\tau)$, the y-polarization sub-waveform is represented as $E_{tot,y}(\zeta,t)$, and $E_{tot}(\zeta,t,\tau) = E_{tot,x}(\zeta,t+\tau) + E_{tot,y}(\zeta,t)$.

In some other examples, the first sub-waveform and the second sub-waveform are the y-polarization waveform and the x-polarization waveform, respectively; the x-polarization sub-waveform is represented as $E_{tot,x}(\zeta,t)$, the y-polarization sub-waveform is represented as $E_{tot,y}(\zeta,t+\tau)$, and $E_{tot}(\zeta,t,\tau) = E_{tot,x}(\zeta,t) + E_{tot,y}(\zeta,t+\tau)$.

In yet some other examples, the first sub-waveform and the second sub-waveform are sub-waveforms of a second spatial mode and a first spatial mode, respectively; the sub-waveform of the first spatial mode is represented as $E_{tot,1}(\zeta,t)$, the sub-waveform of the second spatial mode is represented as $E_{tot,2}(\zeta,t+\tau)$, and $E_{tot}(\zeta,t,\tau) = E_{tot,1}(\zeta,t) + E_{tot,2}(\zeta,t+\tau)$.

In some examples, the second received waveform further includes at least one sub-waveform in addition to the first sub-waveform and the second sub-waveform, spatial modes of all sub-waveforms of the second received waveform are different, and there is a relative delay between the first sub-waveform and any sub-waveform except for the first sub-waveform of the second received waveform. In this case, the nonlinear noise at the predetermined location is also represented by at least one sub-signal waveform at the predetermined location that is obtained from the at least one sub-waveform of the second received waveform.

In some examples, the second received waveform is represented as: $E_{tot}(\zeta,t,\tau_1, \ldots, \tau_{i-1}) = E_{tot,1}(\zeta,t) + E_{tot,2}(\zeta,t+\tau_1) + \ldots + E_{tot,i}(\zeta,t+\tau_{i-1})$, where $E_{tot,1}(\zeta,t)$ represents the first sub-waveform with the first spatial mode, $E_{tot,2}(\zeta,t+\tau_1)$ represents the second sub-waveform with the second spatial mode, and $E_{tot,i}(\zeta,t+\tau_{i-1})$ represents any sub-waveform except for the first sub-waveform and the second sub-waveform, and i is a positive integer and takes a value from 3.

In this case, the template is represented as: $\Delta u_{z_k}(\zeta,t,\tau_1, \ldots, \tau_{i-1}) = -j\hat{D}_{z_k,\zeta}\hat{N}_{eRP}\hat{D}_{0,z_k}(u_1(0, t) + u_2(0, t+\tau_1) + \ldots + u_i(0, t+\tau_{i-1}))$. Where $u_2(0, t+\tau_1)$ represents that $u_2(0, t)$ has the first delay $\tau_1$ with respect to $u_1(0, t)$, $u_1(0, t)$ and $u_2(0, t)$ are normalized signal waveforms of the first spatial mode and the second spatial mode at location 0 and time t, respectively; $u_i(0, t+\tau_{i-1})$ represents that $u_i(0, t)$ has a delay $\tau_{i-1}$ with respect to $u_1(0, t)$, $u_i(0, t)$ is a normalized signal waveform of any spatial mode except for the first spatial mode and the second spatial mode in the spatial modes of all sub-waveforms of the second received waveform at location 0 and time t; j is an imaginary unit of a complex number; $\hat{N}_{eRP}$ represents a nonlinear operator based on the eRP model, $\hat{N}_{eRP} \equiv (|\cdot|^2 - m \times \langle |\cdot|^2 \rangle)(\cdot)$, and m is related to the number of the spatial modes. And the correlation is represented as: $CR(E_{tot}(\zeta,t,\tau_1, \ldots, \tau_{i-1}), \Delta u_{z_k}(\zeta,t,\tau_1, \ldots, \tau_{i-1})) = \int_0^L \gamma P(z)g(z_k-z)dz \equiv \gamma P(z_k)L_{CR}(z_k)$.

It should be noted that the specific working processes of interface circuit 201 and processing circuit 202 can refer to the above method embodiments, which will not be repeated here.

The device 20 has the same beneficial effects as the method for monitoring impairment.

Figure 12A:
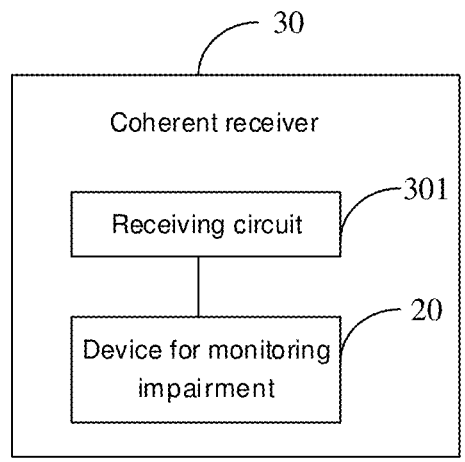
FIG. 12A is a schematic diagram of a coherent receiver, in accordance with some embodiments of the present disclosure.

Embodiments of the present disclosure provide a coherent receiver. As shown in FIG. 12A, the coherent receiver 30 includes a receiving circuit 301 and the device 20 for monitoring impairment. The receiving circuit 301 is used to couple the fiber link and receive the optical signal transmitted by the fiber link. The device 20 is coupled to the receiving circuit 301. The first received waveform received by the device 20 is obtained based on the optical signal.

Figure 12B:
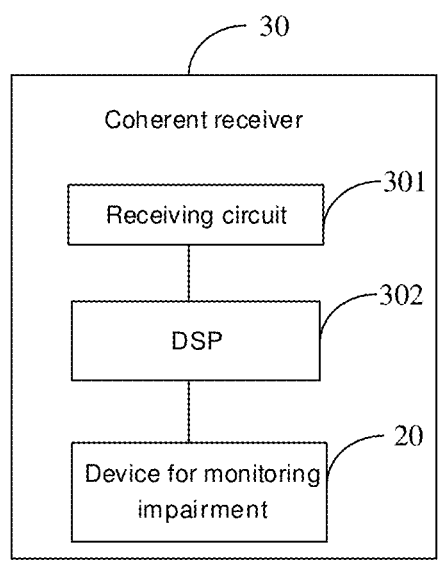
FIG. 12B is a schematic diagram of another coherent receiver, in accordance with some embodiments of the present disclosure.

In some examples, as shown in FIG. 12B, the coherent receiver 30 further includes a DSP 302 arranged between the receiving circuit 301 and the device 20, and coupled to the receiving circuit 301 and the device 20. The DSP 302 is used to perform CD and time delay compensation on the optical signal to obtain the first received waveform, and then send the first received waveform to the device 20.

For example, the device 20 and the DSP 302 may be integrated together or arranged separately.

Since the coherent receiver 30 provided in the embodiments of the present disclosure includes the device 20, it has the same beneficial effects as the method for monitoring impairment.

Figure 13A:
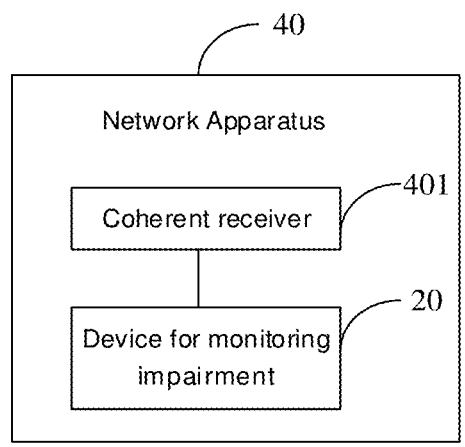
FIG. 13A is a schematic diagram of a network apparatus, in accordance with some embodiments of the present disclosure.

Embodiments of the present disclosure provide a network apparatus. As shown in FIG. 13A, the network apparatus 40 includes a coherent receiver 401 and the device 20 for monitoring impairment. The coherent receiver 401 is used to couple the fiber link and obtain the first received waveform based on the optical signal transmitted by the fiber link. The device 20 is coupled to the coherent receiver 401 and receive the first received waveform.

Here, the coherent receiver 401 may be a traditional coherent receiver.

Figure 13B:
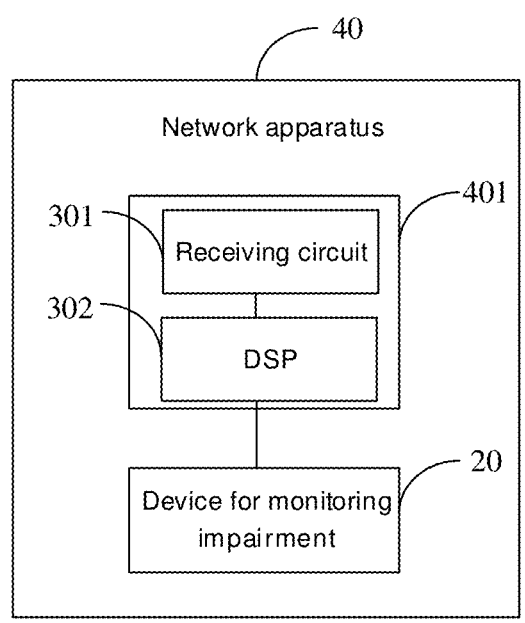
FIG. 13B is a schematic diagram of another network apparatus, in accordance with some embodiments of the present disclosure.

In some embodiments, as shown in FIG. 13B, the coherent receiver 401 includes a receiving circuit 301 and a DSP 302. The receiving circuit 301 is coupled to the fiber link, and is used to receive the optical signal transmitted by the fiber link. The DSP 302 is used to perform CD and time delay compensation on the optical signal to obtain the first received waveform, and then send the first received waveform to the device 20.

It will be noted that, when the DSP 302 in the coherent receiver 401 is not available, the device 20 may be coupled to the analog-to-digital converter (ADC) buffer in the coherent receiver 401 to receive ADC buffer data; in this case, the DSP function may be customized inside the device 20.

Since the network apparatus 40 provided in the embodiments of the present disclosure includes the device 20, it has the same beneficial effects as the method for monitoring impairment.

Some embodiments of the present disclosure provide a computer-readable storage medium (e.g., a non-transitory computer-readable storage medium), and the computer-readable storage medium stores therein instructions that, when run on a computer, cause the computer to execute the method for monitoring impairment in any of the above embodiments.

For example, the computer-readable storage medium may include, but is not limited to, a magnetic storage device (e.g., a hard disk, a floppy disk or a magnetic tape), an optical disk (e.g., a compact disk, a digital versatile disk (DVD)), a smart card, a flash memory device (e.g., an erasable programmable read-only memory (EPROM), a card, a stick or a key driver).

Various computer-readable storage medium described in the present disclosure may represent one or more devices and/or other machine-readable storage medium for storing information. The term "machine-readable storage medium" may include, but is not limited to, wireless channels and various other medium capable of storing, containing and/or carrying instructions and/or data.

Some embodiments of the present disclosure further provide a computer program product. For example, the computer program product is stored on non-transitory computer-readable storage medium. The computer program product includes computer program instructions that, when executed on a computer, cause the computer to perform the method for monitoring impairment in any of the above embodiments.

Operations associated with the method described herein can be implemented as coded instructions in the computer program product.

According to the description of the above embodiments, the embodiments of the present disclosure can be implemented only by hardware, or can also be implemented by software and necessary general hardware platforms. Based on the understanding, the technical solution of the present disclosure can be embodied in the form of a software product. The software product can be stored in non-volatile or non-transitory storage media. The non-volatile or non-transitory storage media may be a compact disk read-only memory (CD-ROM), USB flash disk or mobile hard drive. The software product includes instructions that enable a computer device (personal computer, server or network apparatus) to perform the methods provided in embodiments of the present disclosure. Such execution may correspond, for example, to simulation of logical operations as described herein. In accordance with the embodiments of the present disclosure, the software product may additionally or alternatively include instructions that enable the computer device to perform operations of configuring or programming a digital logic device.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A method for monitoring impairment, applied to monitoring of an optical signal received by a coherent receiver through a fiber link, comprising:
   receiving a first received waveform sent by the coherent receiver;
   obtaining a second received waveform according to the first received waveform, wherein the second received waveform includes a first sub-waveform and a second sub-waveform with a relative first delay therebetween;
   obtaining a template at a predetermined location on the fiber link according to the second received waveform, wherein the template is used for representing a nonlinear noise by a first sub-signal waveform and a second sub-signal waveform at the predetermined location, the first sub-signal waveform and the second sub-signal waveform being respectively obtained from the first sub-waveform and the second sub-waveform and having the relative first delay therebetween;
   obtaining a correlation between the second received waveform and the template;
   changing a value of the relative first delay to obtain values of the correlation corresponding to different values of the relative first delay; and
   outputting a value of the relative first delay corresponding to a maximum value of the correlation as impairment estimation.

2. The method according to claim 1, further comprising:
   traversing each location on the fiber link to obtain values of the correlation corresponding to each location on the fiber link, and to output a value of the relative first delay corresponding to a maximum value of the correlation for each location.

3. The method according to claim 1, wherein the first received waveform is a waveform with delay compensation, and the first received waveform includes a first initial sub-waveform and a second initial sub-waveform;
   obtaining the second received waveform according to the first received waveform includes:
   adding the relative first delay to one of the first initial sub-waveform and the second initial sub-waveform to obtain the first sub-waveform and the second sub-waveform, respectively.

4. The method according to claim 3, wherein obtaining the template at the predetermined location on the fiber link according to the second received waveform includes:
   obtaining a third sub-signal waveform through decision according to the first sub-waveform of the second received waveform, and obtaining a fourth sub-signal waveform through decision according to the second sub-waveform of the second received waveform; and
   obtaining the template at the predetermined location on the fiber link, wherein the first sub-signal waveform and the second sub-signal waveform are obtained from the third sub-signal waveform and the fourth sub-signal waveform, respectively.

5. The method according to claim 1, wherein the template is represented as:

$$\Delta u_{z_k}(\zeta, t, \tau) = -j\hat{D}_{z_k,\zeta}\hat{N}_{eRP}\hat{D}_{0,z_k}(u_1(0, t+\tau) + u_2(0, t)) =$$

$$\hat{D}_{z_k,\zeta}[-j(|u_1(z_k, t+\tau)|^2 + |u_2(z_k, t)|^2 - 3)(u_1(z_k, t+\tau) + u_2(z_k, t))].$$

where $\Delta u_{z_k}(\zeta,t,\tau)$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform; $\hat{D}_{0,z_k}$ represents CD from location 0 to the predetermined location $z_k$ on the fiber link; $u_1(0, t+\tau)$ represents that $u_1(0, t)$ has the relative first delay $\tau$ with respect to $u_2(0, t)$, $u_1(0, t)$ and $u_2(0, t)$ are normalized signal waveforms at location 0 and time t obtained from the first sub-waveform and the second sub-waveform of the second received waveform, respectively; $u_1(z_k,t+\tau)$ and $u_2(z_k,t)$ represent the first sub-signal waveform and the second sub-signal waveform at the predetermined location $z_k$, respectively; j is an imaginary unit of a complex number; $\hat{N}_{eRP}$ represents a nonlinear operator based on an enhanced regular perturbation (eRP) model, $\hat{N}_{eRP} \equiv (|\cdot|^2 - 1.5 \times \langle |\cdot|^2 \rangle)(\cdot)$.

6. The method according to claim 5, wherein the correlation is represented as:

$$CR\bigl(E_{tot}(\zeta, t, \tau), \Delta u_{z_k}(\zeta, t, \tau)\bigr) = \int_0^L \gamma P(z) g(z_k - z) dz \equiv \gamma P(z_k) L_{CR}(z_k);$$

where $CR(A(t),B(t)) \equiv \langle A(t)B^*(t) \rangle$, which represents correlation calculation between $A(t)$ and $B(t)$; $\langle \cdot \rangle$ represents time average operation; $E_{tot}(\zeta,t,\tau)$ represents the second received waveform; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z) dz;$$

$g(z_k-z) \equiv CR(\Delta u_{z_k}(\zeta,t,\tau), \Delta u_z(\zeta,t,\tau))$ represents a spatial response function; $P(z_k)$ represents a signal power at the predetermined location $z_k$; $P(z)$ represents a signal power at location z, and the location z is any location on the fiber link.

7. The method according to claim 6, wherein the first sub-waveform and the second sub-waveform are an x-polarization sub-waveform and a y-polarization sub-waveform, respectively; the x-polarization sub-waveform is represented as $E_{tot,x}(\zeta,t+\tau)$, the y-polarization sub-waveform is represented as $E_{tot,y}(\zeta,t)$, and $E_{tot}(\zeta,t,\tau) = E_{tot,x}(\zeta,t+\tau) + E_{tot,y}(\zeta,t)$; or the first sub-waveform and the second sub-waveform are the y-polarization sub-waveform and the x-polarization sub-waveform, respectively; the x-polarization sub-waveform is represented as $E_{tot,x}(\zeta,t)$, the y-polarization sub-waveform is represented as $E_{tot,y}(\zeta,t+\tau)$, and $E_{tot}(\zeta,t,\tau) = E_{tot,x}(\zeta,t) + E_{tot,y}(\zeta,t+\tau)$.

8. The method according to claim 6, wherein the first sub-waveform and the second sub-waveform are sub-waveforms of a second spatial mode and a first spatial mode, respectively; a sub-waveform of the first spatial mode is represented as $E_{tot,1}(\zeta,t)$, a sub-waveform of the second spatial mode is represented as $E_{tot,2}(\zeta,t+\tau)$, and $E_{tot}(\zeta,t,\tau) = E_{tot,1}(\zeta,t) + E_{tot,2}(\zeta,t+\tau)$.

9. The method according to claim 1, wherein the second received waveform further includes at least one sub-waveform in addition to the first sub-waveform and the second sub-waveform, spatial modes of all sub-waveforms of the second received waveform are different, and there is a relative delay between the first sub-waveform and any sub-waveform except for the first sub-waveform of the second received waveform; and the nonlinear noise at the predetermined location is also represented by at least one sub-signal waveform at the predetermined location that is obtained from the at least one sub-waveform of the second received waveform.

10. The method according to claim 9, wherein the second received waveform is represented as:

$$E_{tot}(\zeta, t, \tau_1, \ldots, \tau_{i-1}) = E_{tot,1}(\zeta, t) + E_{tot,2}(\zeta, t + \tau_1) + \ldots + E_{tot,i}(\zeta, t + \tau_{i-1});$$

where $E_{tot,1}(\zeta,t)$ represents the first sub-waveform with a first spatial mode, $E_{tot,2}(\zeta,t+\tau_1)$ represents the second sub-waveform with a second spatial mode, and $E_{tot,i}(\zeta,t+\tau_{i-1})$ represents any sub-waveform except for the first sub-waveform and the second sub-waveform, and i is a positive integer and takes a value from 3;

the template is represented as:

$$\Delta u_{z_k}(\zeta, t, \tau_1, \ldots, \tau_{i-1}) =$$
$$-j\hat{D}_{z_k,\zeta} \hat{N}_{eRP} \hat{D}_{0,z_k}(u_1(0, t) + u_2(0, t + \tau_1) + \ldots + u_i(0, t + \tau_{i-1}));$$

where $\Delta u_{z_k}(\zeta,t,\tau_1, \ldots, \tau_{i-1})$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform; $\hat{D}_{0,z_k}$ represents CD from location 0 to the predetermined location $z_k$ on the fiber link; $u_2(0, t+\tau_1)$ represents that $u_2(0, t)$ has the relative first delay $\tau_1$ with respect to $u_1(0, t)$, $u_1(0, t)$ and $u_2(0, t)$ are normalized signal waveforms of the first spatial mode and the second spatial mode at location 0 and time t, respectively; $u_i(0, t+\tau_{i-1})$ represents that $u_i(0, t)$ has a delay $\tau_{i-1}$ with respect to $u_1(0, t)$, $u_i(0, t)$ is a normalized signal waveform of any spatial mode except for the first spatial mode and the second spatial mode in the spatial modes of all sub-waveforms of the second received waveform at location 0 and time t; j is an imaginary unit of a complex number; $\hat{N}_{eRP}$ represents a nonlinear operator based on an enhanced regular perturbation (eRP) model, $\hat{N}_{eRP} \equiv (|\cdot|^2 - m \times \langle |\cdot|^2 \rangle)(\cdot)$, and m is related to a number of the spatial modes; and the correlation is represented as:

$$CR\bigl(E_{tot}(\zeta, t, \tau_1, \ldots, \tau_{i-1}), \Delta u_{z_k}(\zeta, t, \tau_1, \ldots, \tau_{i-1})\bigr) =$$
$$\int_0^L \gamma P(z) g(z_k - z) dz \equiv \gamma P(z_k) L_{CR}(z_k);$$

where $CR(A(t),B(t)) \equiv \langle A(t)B^*(t) \rangle$, which represents correlation calculation between $A(t)$ and $B(t)$; $\langle \cdot \rangle$ represents time average operation; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z) dz;$$

$g(z_k-z) \equiv CR(\Delta u_{z_k}(\zeta,t,\tau_1, \ldots, \tau_{i-1}), \Delta u_z(\zeta,t,\tau_1, \ldots, \tau_{i-1}))$ represents a spatial response function; $P(z_k)$ represents a signal power at the predetermined location $z_k$; $P(z)$ represents a signal power at location z, and the location z is any location on the fiber link.

11. A device for monitoring impairment, applied to monitoring of an optical signal received by a coherent receiver through a fiber link, comprising:

an interface circuit used to receive a first received waveform; and a processing circuit coupled to the interface circuit, wherein the processing circuit is used to: obtain a second received waveform according to the first received waveform, the second received waveform including a first sub-waveform and a second sub-waveform with a relative first delay therebetween; obtain a template at a predetermined location on the fiber link according to the second received waveform, the template being used for representing a nonlinear noise by a first sub-signal waveform and a second sub-signal waveform at the predetermined location that are respectively obtained from the first sub-waveform and the second sub-waveform and have the relative first delay therebetween; obtain a correlation between the second received waveform and the template; change a value of the relative first delay to obtain values of the correlation corresponding to different values of the relative first delay; and output a value of the relative first delay corresponding to a maximum value of the correlation as impairment estimation.

12. The device according to claim 11, wherein the processing circuit is further used to traverse each location on the fiber link to obtain values of the correlation corresponding to each location on the fiber link, and to output a value of the relative first delay corresponding to a maximum value of the correlation for each location.

13. The device according to claim 11, wherein the first received waveform is a waveform with delay compensation, and the first received waveform includes a first initial sub-waveform and a second initial sub-waveform; and
the processing circuit is used to add the relative first delay to one of the first initial sub-waveform and the second initial sub-waveform to obtain the first sub-waveform and the second sub-waveform, respectively.

14. The device according to claim 13, wherein the processing circuit is used to: obtain a third sub-signal waveform through decision according to the first sub-waveform of the second received waveform, and obtain a fourth sub-signal waveform through decision according to the second sub-waveform of the second received waveform; and obtain the template at the predetermined location on the fiber link, the first sub-signal waveform and the second sub-signal waveform being obtained from the third sub-signal waveform and the fourth sub-signal waveform, respectively.

15. The device according to claim 11, wherein the template is represented as:

$$\Delta u_{z_k}(\zeta, t, \tau) = -j\hat{D}_{z_k,\zeta}\hat{N}_{eRP}\hat{D}_{0,z_k}(u_1(0, t+\tau) + u_2(0, t)) =$$
$$\hat{D}_{z_k,\zeta}[-j(|u_1(z_k, t+\tau)|^2 + |u_2(z_k, t)|^2 - 3)(u_1(z_k, t+\tau) + u_2(z_k, t))];$$

wherein $\Delta u_{z_k}(\zeta,t,\tau)$ is the template prepared for the predetermined location $z_k$; $\hat{D}_{z_k,\zeta}$ represents chromatic dispersion (CD) from the predetermined location $z_k$ to location $\zeta$ on the fiber link, and the location $\zeta$ is any location on the fiber link and matches with the first received waveform;
$\hat{D}_{0,z_k}$ represents CD from location 0 to the predetermined location $z_k$ on the fiber link; $u_1(0, t+\tau)$ represents that $u_1(0, t)$ has the relative first delay $\tau$ with respect to $u_2(0, t)$, $u_1(0, t)$ and $u_2(0, t)$ are normalized signal waveforms at location 0 and time t obtained from the first sub-waveform and the second sub-waveform of the second received waveform, respectively; $u_1(z_k,t+\tau)$ and $u_2(z_k,t)$ represent the first sub-signal waveform and the second sub-signal waveform at the predetermined location $z_k$, respectively; j is an imaginary unit of a complex number; $\hat{N}_{eRP}$ represents a nonlinear operator based on an enhanced regular perturbation (ERP) model, $\hat{N}_{eRP} \equiv (|\cdot|^2 - 1.5 \times \langle |\cdot|^2 \rangle)(\cdot)$.

16. The device according to claim 15, wherein the correlation is represented as:

$$CR(E_{tot}(\zeta, t, \tau), \Delta u_{z_k}(\zeta, t, \tau)) = \int_0^L \gamma P(z)g(z_k - z)dz \equiv \gamma P(z_k)L_{CR}(z_k);$$

wherein $CR(A(t),B(t)) \equiv \langle A(t)B^*(t) \rangle$, which represents correlation calculation between A(t) and B(t); $\langle \cdot \rangle$ represents time average operation; $E_{tot}(\zeta,t,\tau)$ represents the second received waveform; $\gamma$ represents a nonlinear coefficient; $L_{CR}(z)$ is an effective correlation length at location z, $$L_{CR}(z_k) \equiv \int_0^L \frac{P(z)}{P(z_k)} g(z_k - z)dz;$$

$g(z_k-z) \equiv CR(\Delta u_{z_k}(\zeta,t,\tau), \Delta u_z(\zeta,t,\tau))$ represents a spatial response function; $P(z_k)$ represents a signal power at the predetermined location $z_k$; $P(z)$ represents a signal power at location z, and the location z is any location on the fiber link.

17. A coherent receiver, comprising:
a receiving circuit used for coupling a fiber link and receiving an optical signal transmitted by the fiber link; and
the device according to claim 11, wherein the first received waveform received by the device is obtained based on the optical signal.

18. The coherent receiver according to claim 17, further comprising a digital signal processor (DSP) coupled to the receiving circuit and the device, wherein
the DSP is used to perform chromatic dispersion (CD) and time delay compensation on the optical signal to obtain the first received waveform, and then send the first received waveform to the device.

19. A network apparatus, comprising:
a coherent receiver coupled to a fiber link, wherein the coherent receiver is used to obtain a first received waveform based on an optical signal transmitted by the fiber link; and
the device according to claim 11, the device being coupled to the coherent receiver and receiving the first received waveform.

20. The network apparatus according to claim 19, wherein the coherent receiver includes a receiving circuit and a digital signal processor (DSP), wherein
the receiving circuit is coupled to the fiber link for receiving the optical signal transmitted by the fiber link; and
the DSP is used to perform chromatic dispersion (CD) and time delay compensation on the optical signal to obtain the first received waveform, and then send the first received waveform to the device.

* * * * *

UNITED STATES PATENT AND TRADEMARK OFFICE
CERTIFICATE OF CORRECTION

PATENT NO. : 12,506,537 B2
APPLICATION NO. : 18/492905
DATED : December 23, 2025
INVENTOR(S) : Jiang et al.

Page 1 of 1

It is certified that error appears in the above-identified patent and that said Letters Patent is hereby corrected as shown below:

In the Claims

In Column 20, in Claim 5, Line 46, delete "]." and insert -- ]; --.

In Column 22, in Claim 10, Line 47, delete "$\Delta uz(\zeta,t,\tau 1, \ldots ,\tau i-1)$" and insert -- $\Delta uz(\zeta,t,\tau 1, \ldots ,\tau i-1))$ --.

In Column 24, in Claim 15, Line 2, delete "(ERP)" and insert -- (eRP) --.

In Column 24, in Claim 16, Line 22, delete "$\Delta uz(\zeta,t,\tau)$" and insert -- $\Delta uz(\zeta,t,\tau))$ --.

Signed and Sealed this
Third Day of February, 2026

John A. Squires
*Director of the United States Patent and Trademark Office*